(12) United States Patent
Harakawa

(10) Patent No.: US 6,434,255 B1
(45) Date of Patent: Aug. 13, 2002

(54) HAND POINTING APPARATUS

(75) Inventor: Kenichi Harakawa, Chiba-ken (JP)

(73) Assignee: Takenaka Corporation, Osaka (JP)

( * ) Notice: Subject to any disclaimer, the term of this patent is extended or adjusted under 35 U.S.C. 154(b) by 0 days.

(21) Appl. No.: 09/177,428

(22) Filed: Oct. 23, 1998

(30) Foreign Application Priority Data

Oct. 29, 1997 (JP) .............................................. 9-296788

(51) Int. Cl.$^7$ ................................................ G06K 9/00

(52) U.S. Cl. ....................................... 382/103; 348/169

(58) Field of Search ................................ 382/103, 153, 382/141, 291, 107; 396/330; 364/513

(56) References Cited

U.S. PATENT DOCUMENTS

| | | | | |
|---|---|---|---|---|
| 4,402,053 A | * | 8/1983 | Kelley et al. ................ | 346/513 |
| 5,168,531 A | * | 12/1992 | Sigel ............................ | 382/48 |
| 5,454,043 A | * | 9/1995 | Freeman ..................... | 382/168 |
| 5,499,306 A | * | 3/1996 | Sasaki et al. ................ | 382/291 |
| 5,579,444 A | * | 11/1996 | Dalziel et al. ................ | 395/94 |
| 5,616,078 A | | 4/1997 | Oh ................................ | 463/8 |
| 5,850,580 A | * | 12/1998 | Taguchi et al. ............. | 396/330 |

FOREIGN PATENT DOCUMENTS

| | | | | |
|---|---|---|---|---|
| EP | 0 571 702 A | 12/1993 | ............. | G06F/3/00 |
| EP | 0 866 419 A | 9/1998 | ........... | G06K/11/08 |
| JP | 4-271423 | 2/1991 | ............. | G06F/3/03 |
| JP | 5-19957 | 7/1991 | ............. | G06F/0/33 |
| JP | 5-324181 | 5/1992 | ........... | G06F/3/033 |

OTHER PUBLICATIONS

Ishibuchi K et al: "Real Time Hand Gesture Recognition Using 3D Prediction Model" Proceedings of the Conference On Systems, Man and Cybenetics Le Touquet, Oct. 17–20, 1993, vol. 5, Oct. 17, 1993, pp. 324–328, XP000462879—Institute of Electrical and Electronics Engineers *the whole document*.

Masaaki Fukumoto et al: ""Finger–Pointer": Pointing Interface by Image Processing" Computers and Graphics, vol. 18, No. 5, Sep. 1, 1994, pp. 633–642, XP000546603 *the whole document* Patent Abstracts of Japan—vol. 097, No. 004, Apr. 30, 1997 & JP 08 328735 A (Takenaka Komuten Co. Ltd.), Dec. 13, 1996 *abstract*.

Makoto Sato, "Elementary Techniques for Virtual Reality III" from Vizualized Information, vol. 14., No. 54, Jul. 1994, pp. 1–11.

"Pseudo Workspace using Large Screen Stereoscopic Display", The 20th Image Engineering Conference, 1989, pp. 1–12.

* cited by examiner

Primary Examiner—Bhavesh Mehta
Assistant Examiner—Abolfazl Tabatabai
(74) Attorney, Agent, or Firm—Michael D. Bednarek; Shaw Pittman LLP

(57) ABSTRACT

An image which represents a 3-D space virtually using a perspective method is displayed on a display, and an image of an information inputting person is picked up by a plurality of video cameras from different directions. While the information inputting person is pointing at an arbitrary position within a virtual 3-D space represented by the displayed image, a reference point which corresponds to the back of the information inputting person and a characteristic point which corresponds to a finger tip are respectively extracted from a plurality of images which are picked up by each of the video cameras, and the 3-D coordinates of these points are determined. The direction in which the position pointed to by the information inputting person is disposed within the virtual 3-D space is determined on the basis of the direction from the reference point to the characteristic point, and the distance between the information inputting person and the position pointed to by the information inputting person within the virtual 3-D space is determined on the basis of the distance between the reference point and the characteristic point. As a result, the 3-D coordinates of the position pointed to by the information inputting person within the virtual 3-D space can be determined.

22 Claims, 29 Drawing Sheets

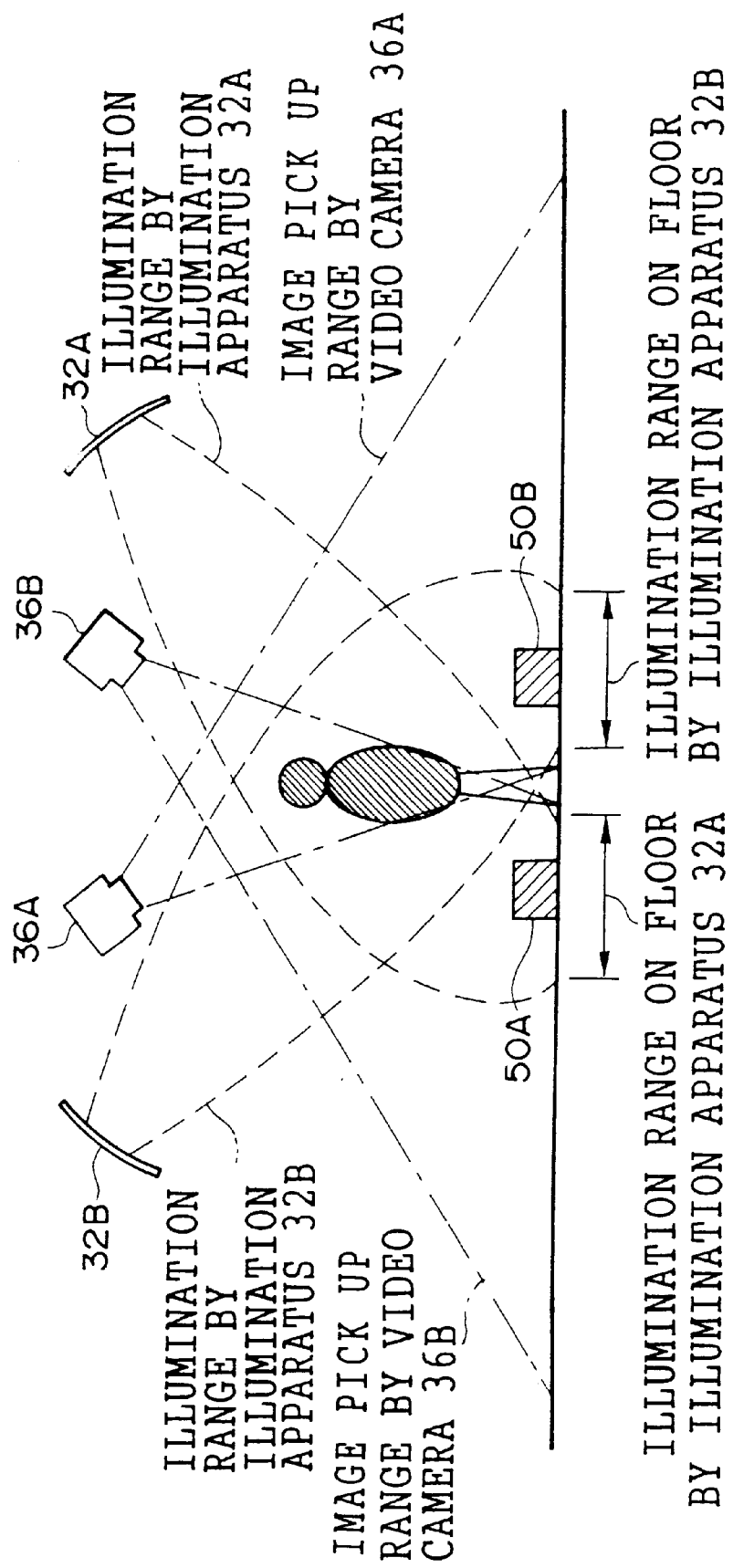

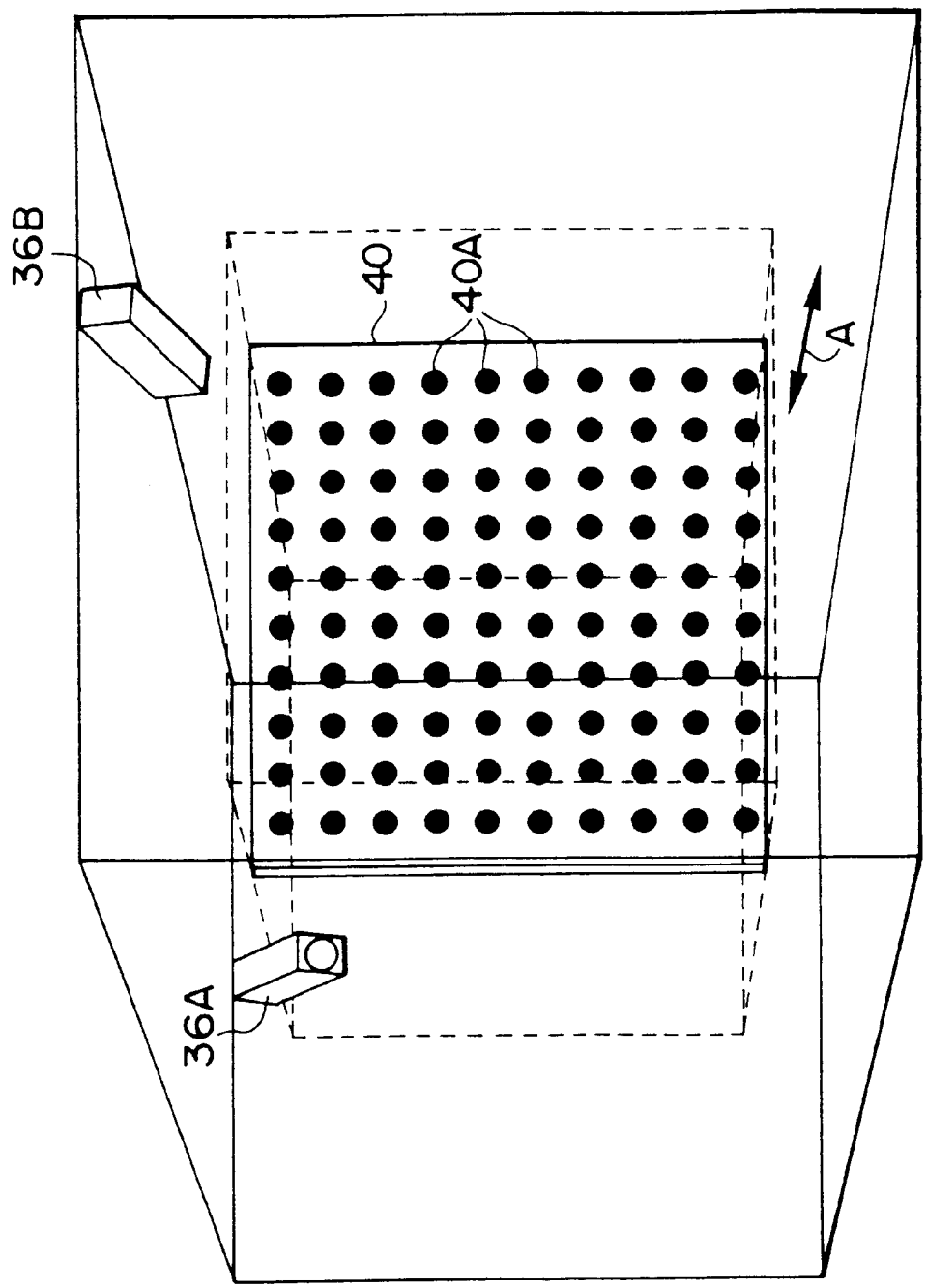

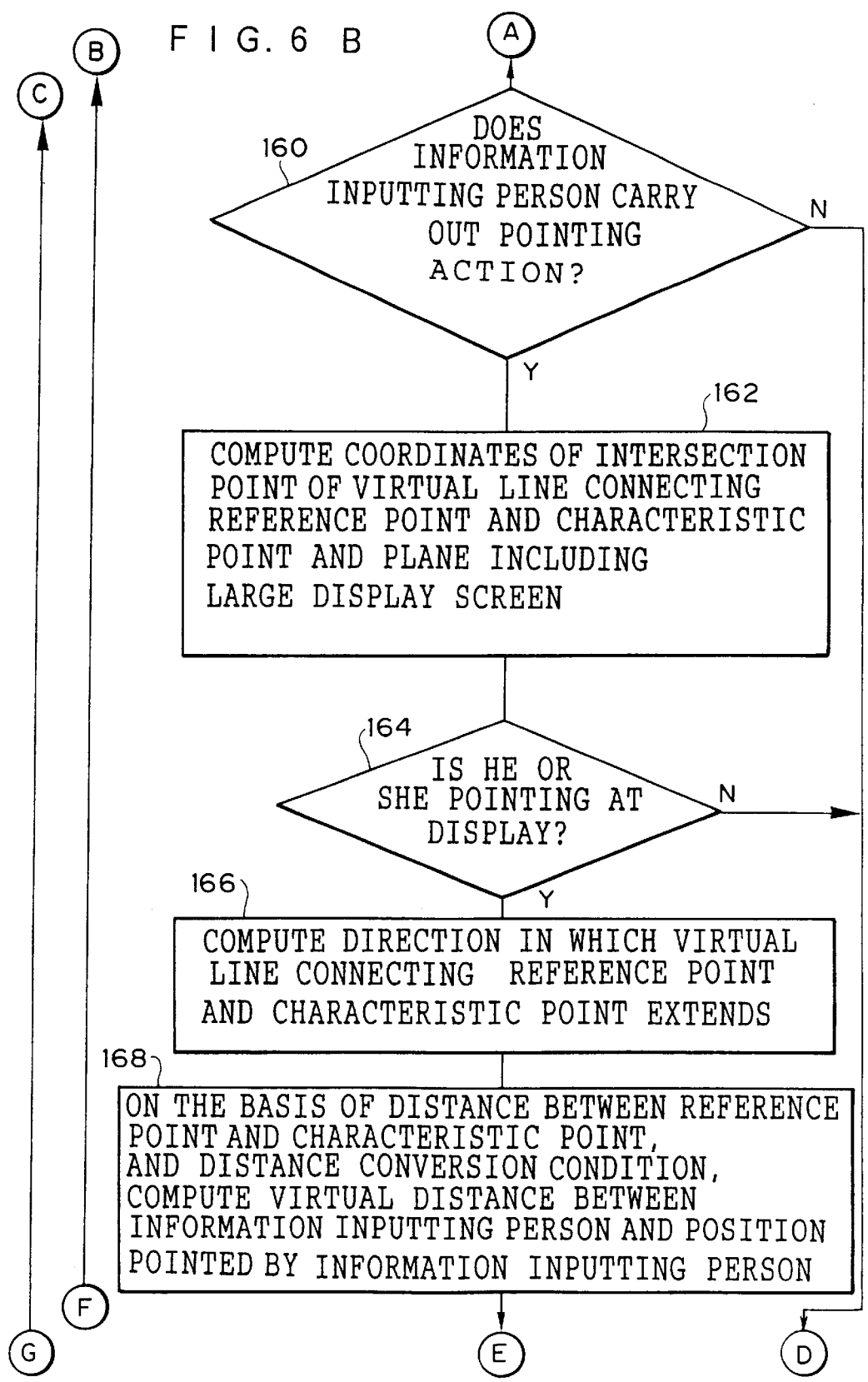

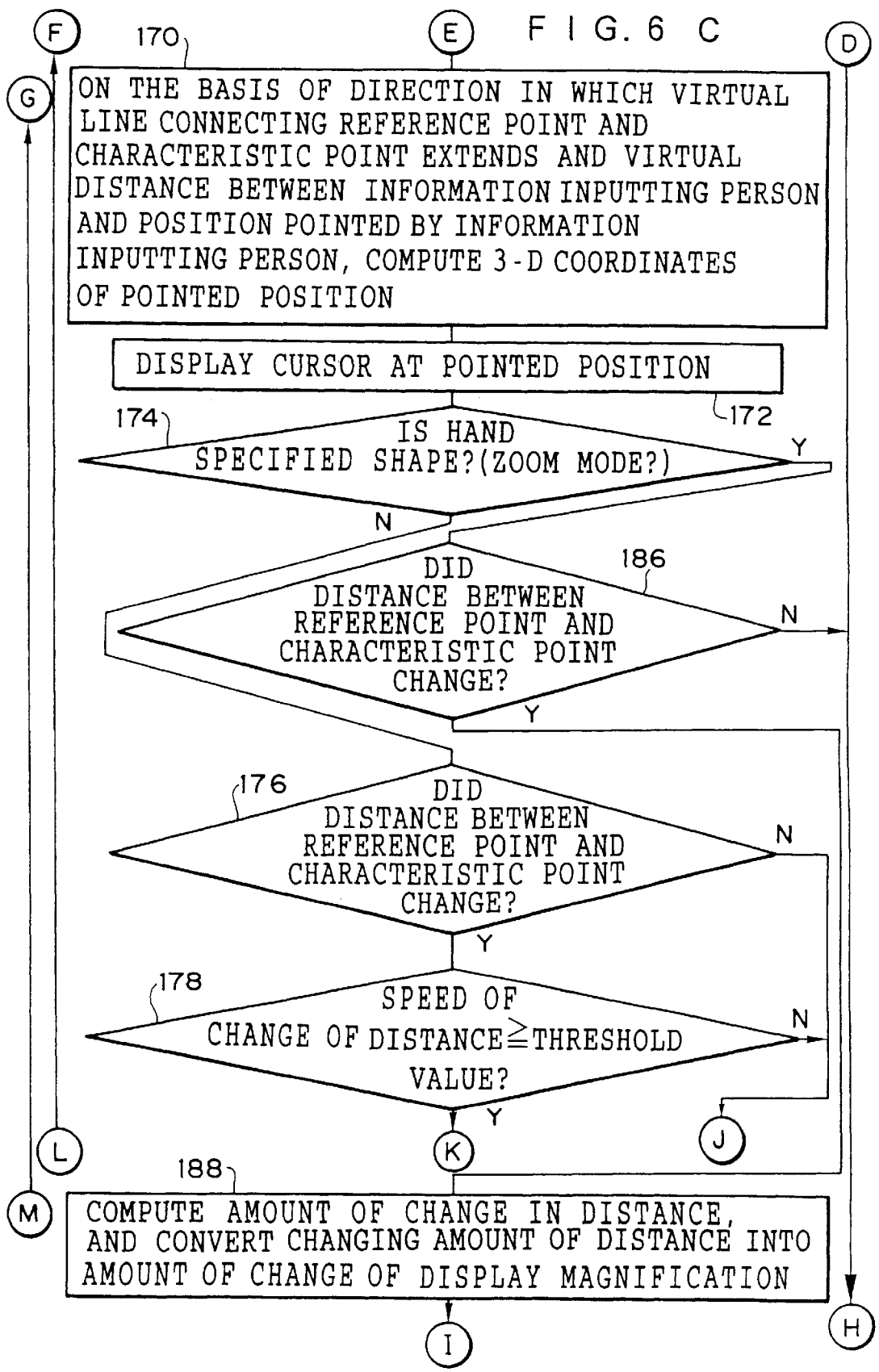

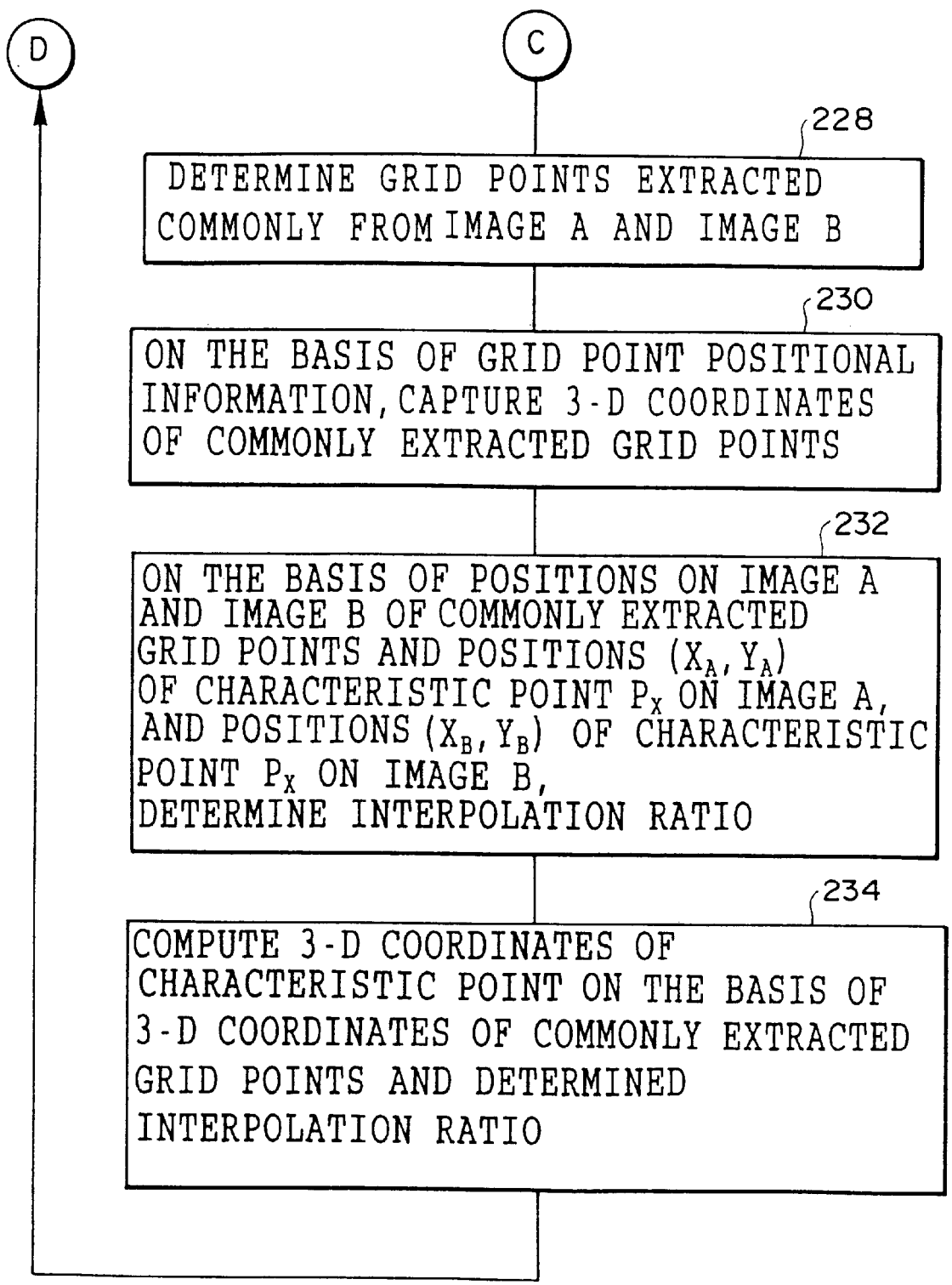

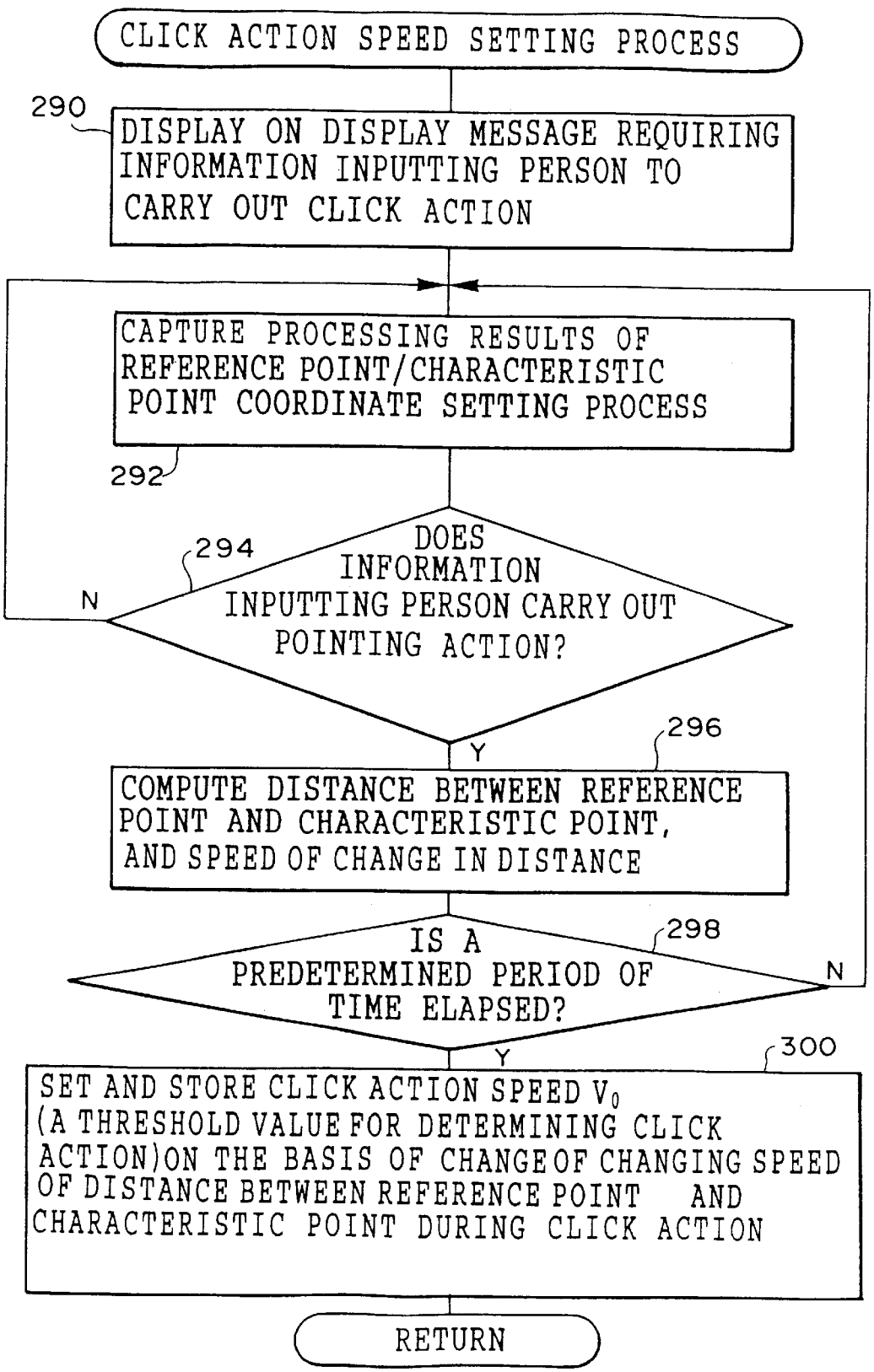

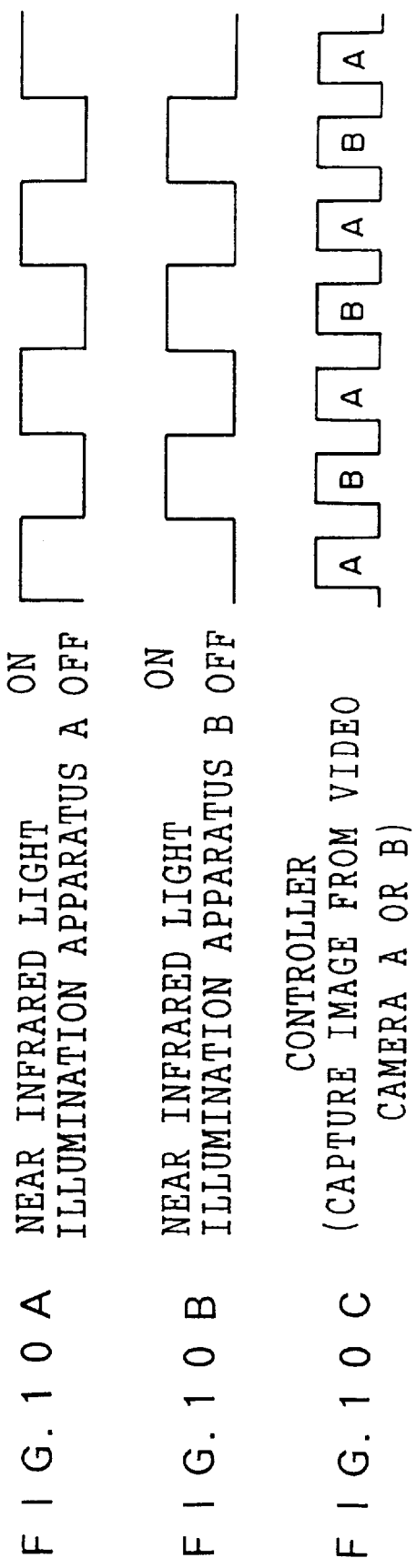

F I G. 1 3 A
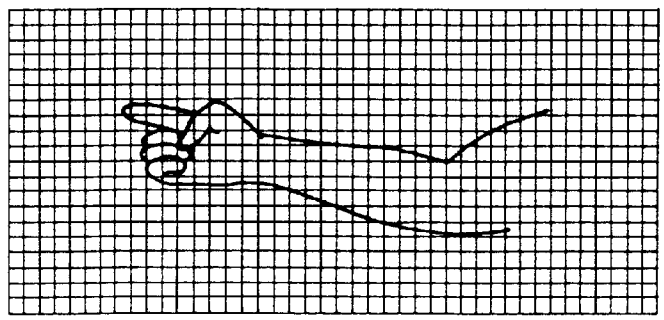
F I G. 1 3 B
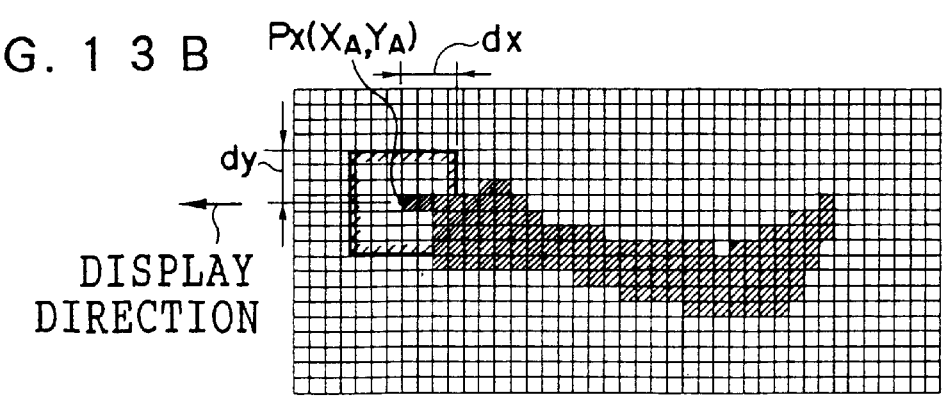

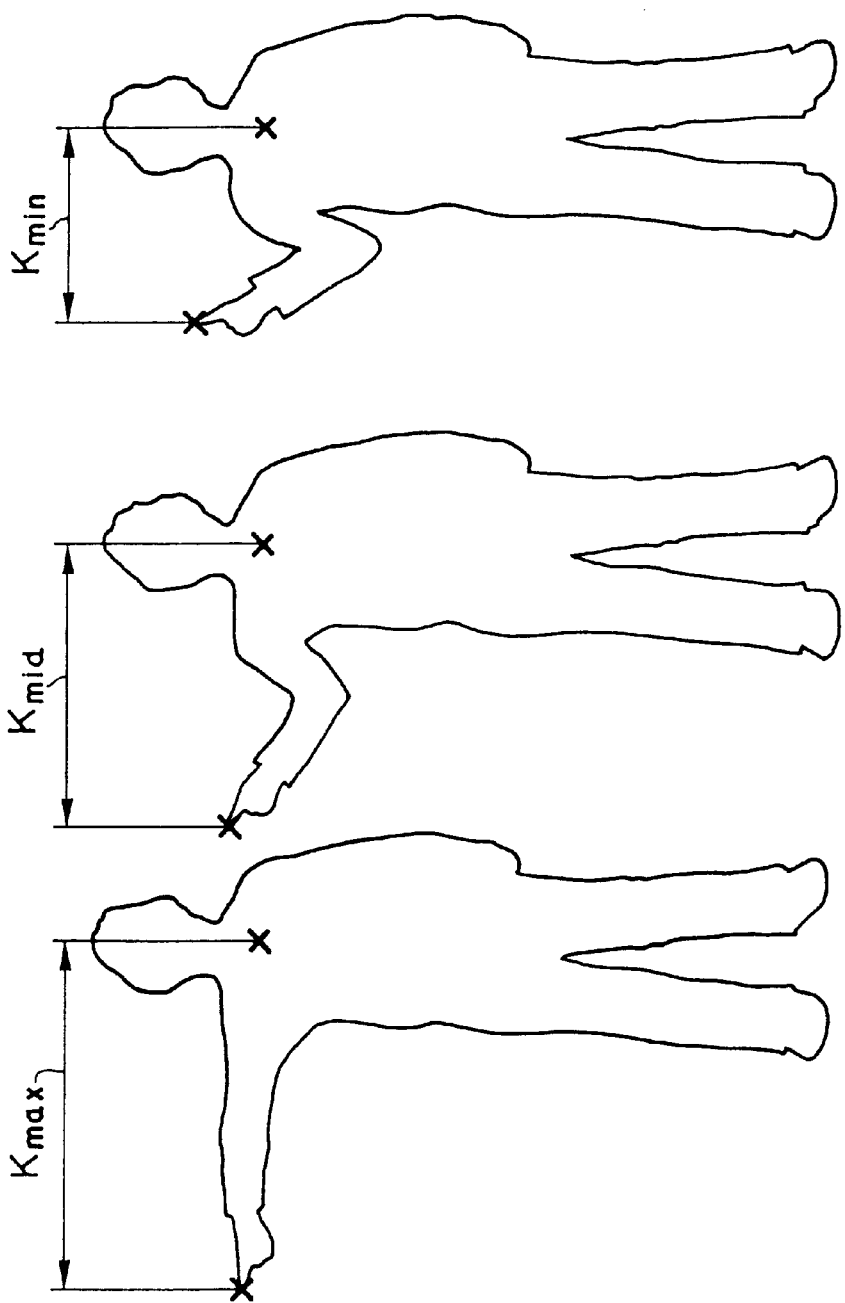

F I G. 1 6 A
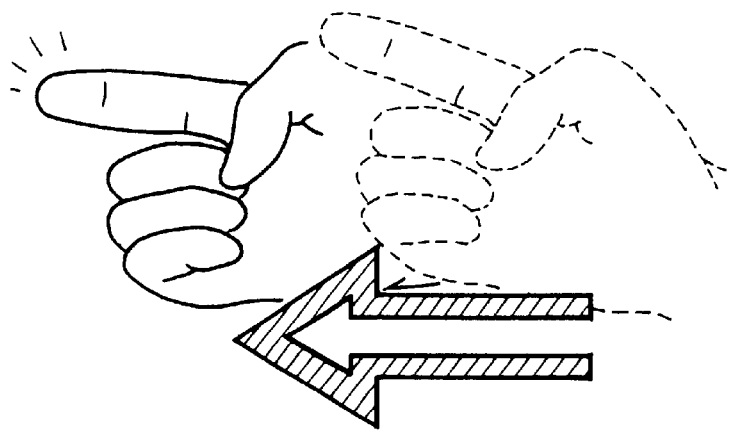
F I G. 1 6 B
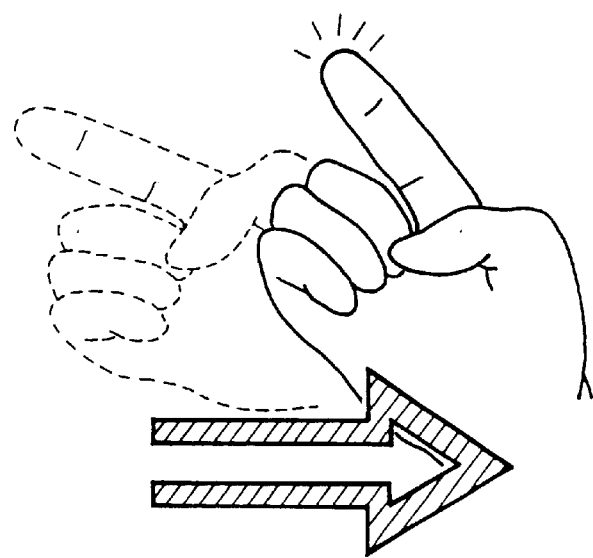

F I G. 1 7 A
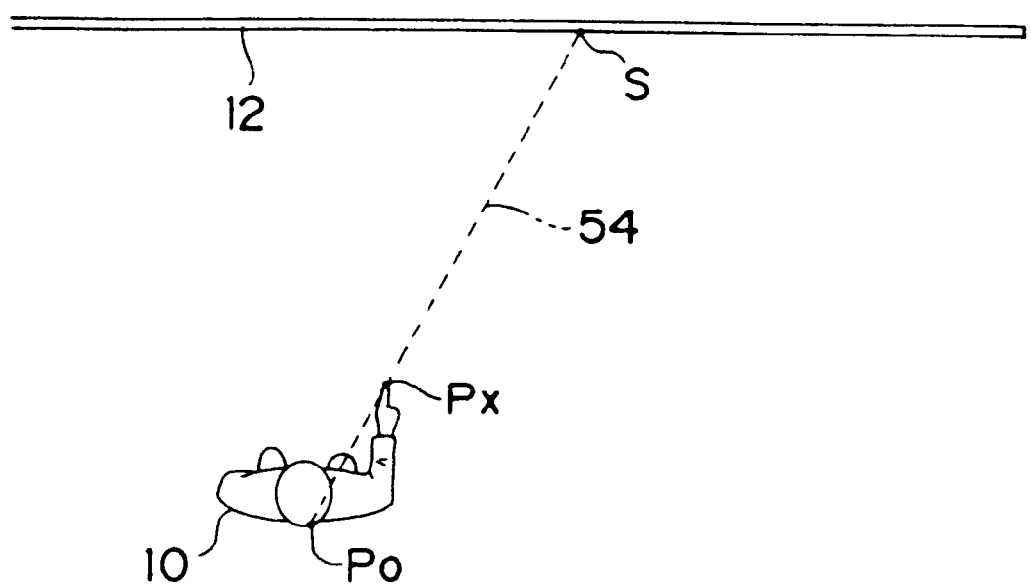
F I G. 1 7 B
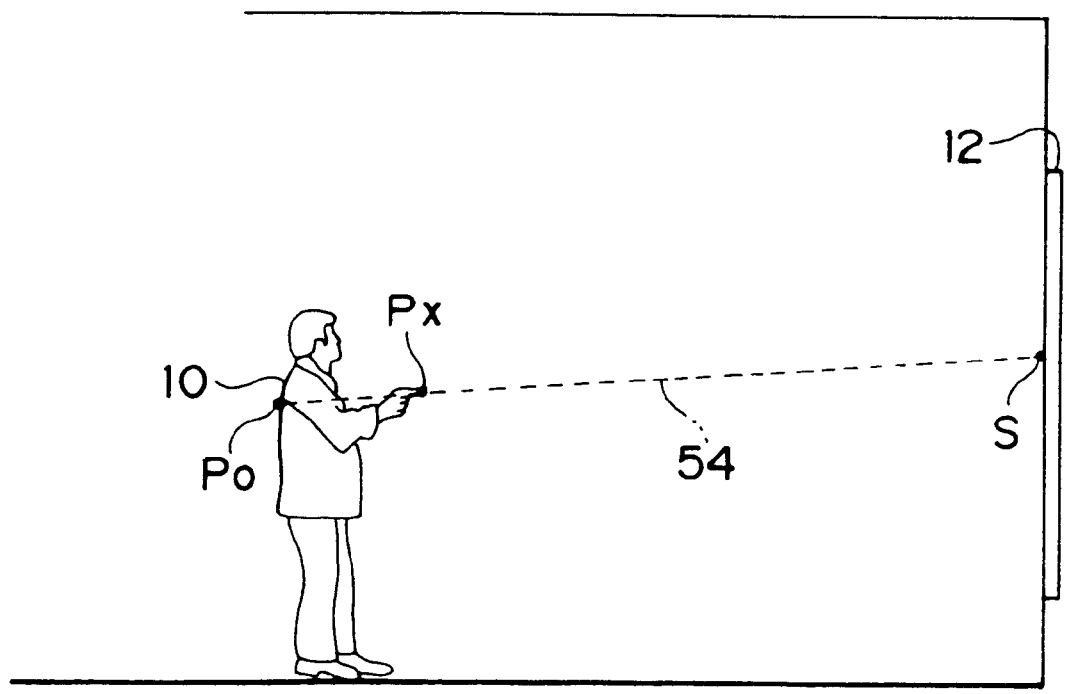

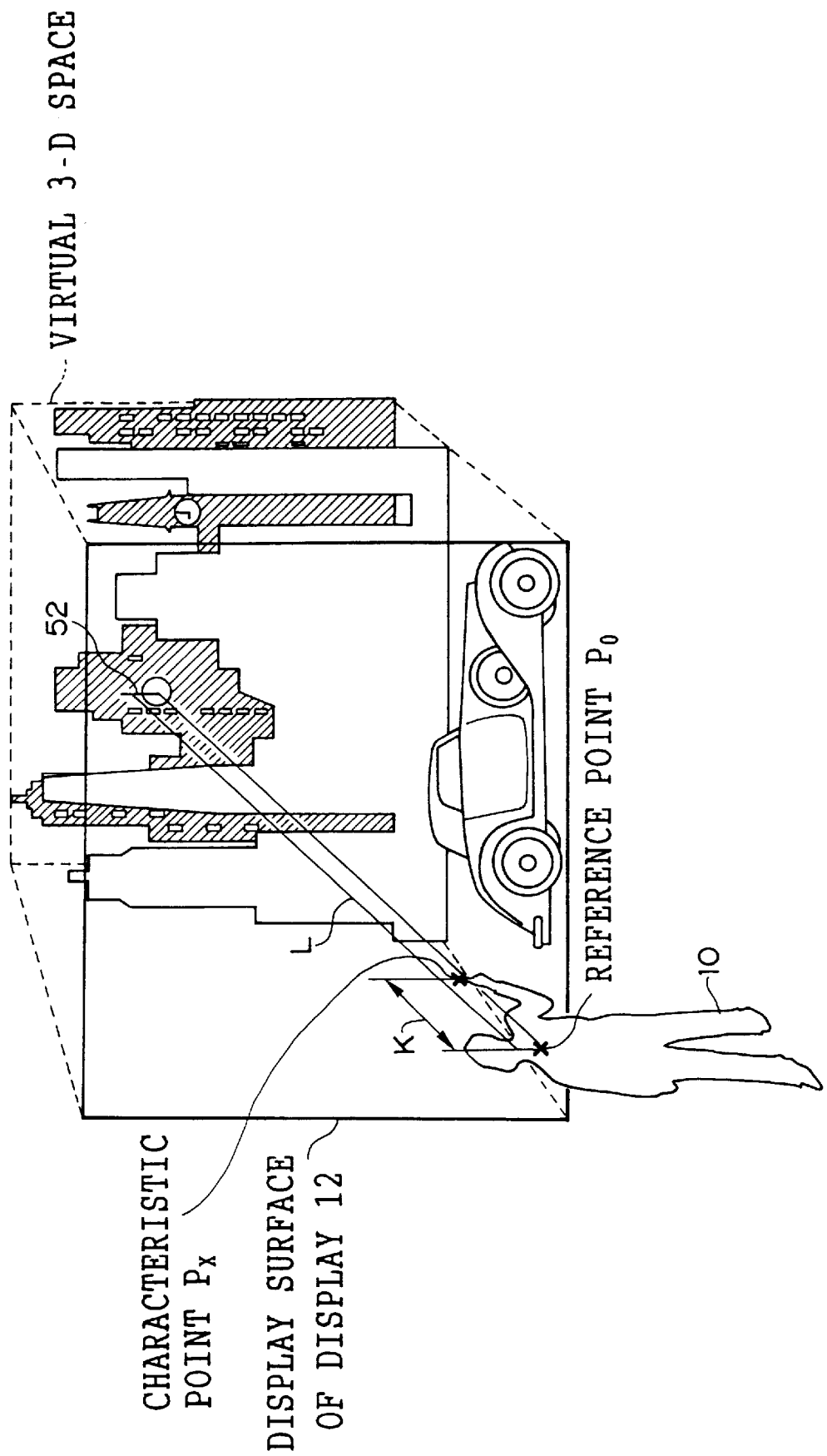

F I G. 1 9 A
F I G. 1 9 B
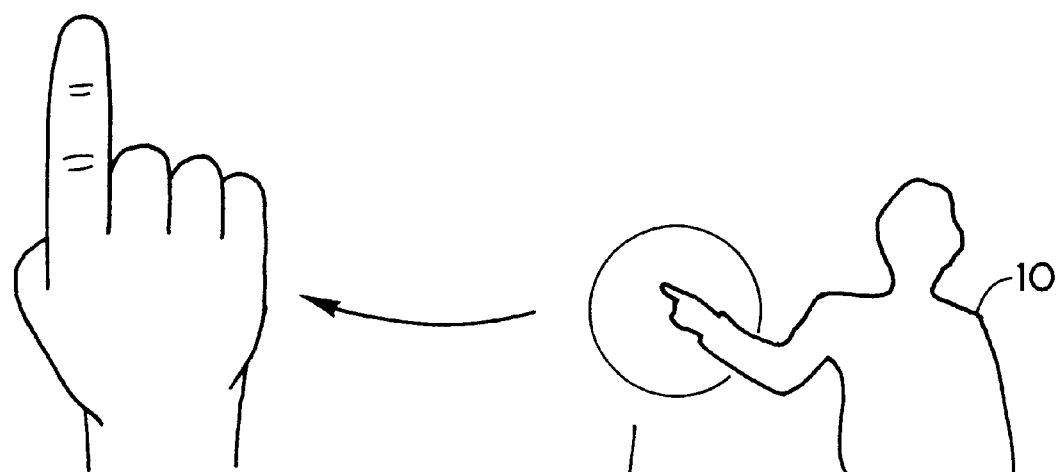
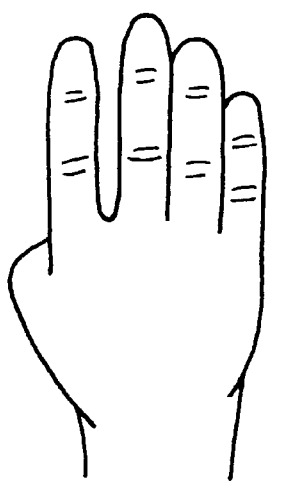

HAND POINTING APPARATUS

BACKGROUND OF THE INVENTION

1. Field of the Invention

The present invention relates to a hand pointing apparatus, and more specifically to a hand pointing apparatus for picking up a person to be recognized from a plurality of different directions and for determining the coordinates of a specific position pointed to by the person to be recognized.

2. Description of the Related Art

There has been heretofore known a hand pointing input apparatus which comprise a display for displaying predetermined information, an illumination device for illuminating an information inputting person who comes to the display, and a plurality of image pickup means for picking up the image of the approaching information inputting person from different directions, wherein a plurality of image pickup means image pickup images of situations where the approaching information inputting person points with a finger or the like to an optional position on the display, the information inputting person is recognized in accordance with a plurality of images obtained by the image pickup, the position on the display pointed to by the information inputting person is determined, a cursor or the like is displayed on the position pointed to on the display, and the position on the display pointed to is recognized as being clicked at the time of detecting the fact that the information inputting person has performed a clicking action by raising a thumb, whereby a predetermined processing is performed (see, for example, Japanese Patent Application Laid-Open (JP-A) Nos. 4-271423, 5-19957, and 5-324181 or the like).

According to the above-described hand pointing input apparatus, since the information inputting person can give various instructions to an information processing apparatus and input various information to the information processing apparatus without touching an input device such as a keyboard or a mouse, it is possible to simplify the operation for using the information processing apparatus.

The above-described hand pointing input apparatus can determine which position on the display screen of the display the information inputting person is pointing to. However, if the displayed image on the display is an image spuriously representing a 3-D (three-dimensional) space, this hand pointing input apparatus cannot determine which position within a virtual 3-D space represented by the image (i.e., the 3-D coordinates of a position pointed to by the information inputting person) the information inputting person is pointing to. As to spuriously displaying an image representing a 3-D space, apart from displaying images in conformity with a one-point perspective or two-point perspective on a planar display, various methods have been also provided in which images can be displayed on a 3-D display using a liquid-crystal shutter or a lenticular lens, stereographic images can be displayed by applying holographic technology, and the like (these images are referred to as three-dimensional images hereinafter). However, there has been a drawback in that three-dimensional images such as those described above cannot be used as an object pointed to by the information inputting person.

Further, the above-described drawback is not limited to the case in which the object pointed to by the information inputting person is a virtual 3-D space represented by a three-dimensional image. It is also impossible to determine the position within a 3-D space the information inputting person is pointing to, even when the object pointed to by the information inputting person exists within an actual 3-D space.

SUMMARY OF THE INVENTION

In view of the aforementioned, it is an object of the present invention to provide a hand pointing apparatus which can determine 3-D coordinates of a position which is pointed to by an information inputting person even when the person is pointing to an arbitrary position within a 3-D space.

In order to accomplish the aforementioned object, the first aspect of the present invention is a hand pointing apparatus, comprising: image pickup means which picks up the image of a person to be recognized from a plurality of different directions; computing means which extracts an image which corresponds to the person to be recognized on the basis of a plurality of images obtained by the image pickup means which picks up images from a plurality of direction of the person to be recognized pointing to a specific position within 3-D coordinates, and determines the 3-D coordinates of a characteristic point whose position may be changed by the person to be recognized bending or stretching an arm, and a reference point whose position does not change even when the person to be recognized bends or stretches the arm; and determining means for determining the direction in which the specific position exists within the 3-D space on the basis of the direction from the reference point to the characteristic point and for determining the location of the specific position within the 3-D space along the depth direction thereof on the basis of the distance between the reference point and the characteristic point, and thereby determines the 3-D coordinates of the specific position within the 3-D space.

In the first aspect of the present invention, an image of the person to be recognized (the information inputting person) is picked up by the image pickup means, from a plurality of different directions. The image pickup means may be structured so that the image of the person to be recognized is picked up from a plurality of directions using a plurality of image pickup apparatuses which are comprised of video cameras or the like. It can also be structured such that light reflecting means such as a plane mirror or the like is provided at the image pickup means, and an image of the person to be recognized is picked up directly by a single image pickup apparatus, and the image of the person to be recognized is picked up from a plurality of directions by picking up virtual images of the person to be recognized which are projected onto the plane mirror.

Further, the computing means extracts an image portion which corresponds to the person to be recognized on the basis of a plurality of images picked up from a plurality of directions using the image pickup means, wherein the person to be recognized is pointing to a specific position within a 3-D space, and determines the 3-D coordinates of a characteristic point whose position may be changed by the person to be recognized bending or stretching an arm, and a reference point whose position does not change even when the person to be recognized bends or stretches an arm. For example, a point which corresponds to the tip of the hand, finger or the like of the person to be recognized or the tip of a pointing apparatus which is grasped by the person to be recognized can be used as a characteristic point. A point which corresponds to the body of the person to be recognized (e.g., the breast or the shoulder joint of the person to be recognized) can be used as a reference point. The 3-D space may be a virtual 3-D space represented by a three dimensional image such as an image which is formed in conformity with a one-point perspective method or two-point perspective method on a planar display, an image which uses a liquid crystal shutter or a lenticular lens on a 3-D display, or a stereographic image which is displayed by applying holographic technology, or the 3-D space may be an actual 3-D space.

The determining means for determining the direction in which the specific position exists within the 3-D space, on the basis of the direction from the reference point to the characteristic point, determines the position of the specific position within the 3-D space along the depth direction thereof on the basis of the distance between the reference point and the characteristic point, and thereby determines 3-D coordinates of the specific position within the 3-D space.

Accordingly, the person to be recognized carries out the operation for adjusting the direction of the characteristic point (i.e., the operation of pointing the hand, finger, or tip of a pointing device of the person to be recognized towards a specific position) with respect to the reference point such that the direction from the reference point to the characteristic point corresponds to the direction in which the specific position exists as the object pointed to, as seen from the point of view of the person to be recognized. Additionally, the person to be recognized carries out the operation for adjusting the distance between the reference point and the characteristic point (i.e., the operation of bending or stretching the arm by the person to be recognized) in accordance with the distance between the specific position and the person to be recognized (i.e., how near to or far from the person to be recognized) so that the direction in which the specific position exists within the 3-D space and the position of the specific position exists within the 3-D space along the depth direction thereof can be determined, and the 3-D coordinates of the specific position can be determined within the 3-D space on the basis of the results of the determining of the aforementioned direction and the position of the specific position in the depth direction thereof.

In accordance with the first aspect of the present invention, when the information inputting person (the person to be recognized) points to an arbitrary position within the 3-D space, the 3-D coordinates of the position pointed to can be determined. Further, the action of pointing a hand or finger or the tip of a pointing device towards the direction where the specific position exists as seen by the person to be recognized and bending or extending an arm to cover the distance to the specified position by the person to be recognized is an extremely natural action for pointing to a specific position inside a 3-D space. Accordingly, the information inputting person (the person to be recognized) can carry out the above-described action without any annoyance involved with this action.

As described in the second aspect of the present invention, the determination of the location of the specific position along the depth direction of the 3-D space on the basis of the distance between the reference point and the characteristic point can be effected by converting the distance between the reference point and the characteristic point into the distance between the person to be recognized and the specific position according to a predetermined conversion conditions. The aforementioned conversion conditions can be conversion characteristics in which the distance between the person to be recognized and the specific position may vary linearly or non-linearly to correspond to the change of the distance between the reference point and the characteristic point.

Especially when the 3-D space serving as an object which is pointed to by the person to be recognized is a space whose depth is very long (e.g., when a three dimensional image which represents the universe is displayed on the display means), if the conversion characteristics of the conversion conditions are made non-linear (conversion characteristics or the like which cause the distance between the person to be recognized and the specific position to vary in proportion to the number raised to the nth ($n \geq 2$) power of the change in the distance between the reference point and the characteristic point), it allows the person to be recognized to point to a position located at an extreme distance within the 3-D space as seen from the person to be recognized without carrying out exaggerated actions such as the stretching or bending of an arm beyond what is normal. As a result, it is preferable because the person to be recognized can be prevented from being burdened by the action of pointing to an arbitrary position within a 3-D space.

Further, because the physique of the person to be recognized (especially, the length of the arm) is not fixed, the width of the movement of the characteristic point when the person to be recognized bends or stretches an arm is different for each person. When the distance between the reference point and the characteristic point is converted into the distance between the person to be recognized and the specific position in accordance with fixed conversion conditions, the case in which the location of the specific position which is pointed to by the person to be recognized cannot be determined accurately due to variables such as the individual lengths of the arms of the persons to be recognized or the like can be thought of.

For this reason, in accordance with the third aspect of the present invention, there is provided a hand pointing apparatus according to the second aspect of the present invention, further comprising: conversion conditions setting means which requests the person to be recognized to carry out the arm bending or stretching action, and sets in advance the conversion conditions which convert the distance between said reference point and the characteristic point into the distance between the person to be recognized and the specific position on the basis of the extent of the change in the distance between the reference point and the characteristic point when the person to be recognized carries out the arm bending or stretching action.

According to the third aspect of the present invention, since the conversion conditions which convert the distance between the reference point and the characteristic point into the distance between the person to be recognized and the specific position is set in advance on the basis of the extent of the change in the distance between the reference point and the characteristic point (the extent of the change in the distance may vary due to the individual lengths of the arms of the persons to be recognized or the like) when the person to be recognized carries out the arm bending or stretching action, conversion conditions can be obtained in accordance with the physique of each of the person to be recognized. By carrying out the aforementioned conversion using these conversion conditions, in spite of the variables arising from the individual physiques of the persons to be recognized, it is possible to accurately determine the location of the specific position along the depth direction thereof which is pointed to by the person to be recognized. Moreover, for example, in order to inform the hand pointing apparatus of the fact that the person to be recognized is pointing to an extremely remote position within the 3-D space, the person to be recognized whose physique is especially small does not need to carry out any exaggerated actions beyond what is normal.

In accordance with the third aspect of the present invention, a single position which is located in the intermediate portion of a 3-D space along the depth direction thereof, or a plurality of portions whose locations are different from each other within the 3-D space in the depth direction thereof (the location of position in the 3-D space along the depth direction thereof is already known) is pointed to by the person to be recognized so that conversion conditions (the configuration of a conversion curve) can be set on the basis of the distance between the reference point and the characteristic point at this time.

In accordance with the fourth aspect of the present invention, there is provided a hand pointing apparatus according to the first aspect of the present invention, further comprising: display means which displays a three dimensional image; display control means which displays the three dimensional image on the display means; and determining means which determines whether the hand of the person to be recognized is in a specific shape, wherein the three dimensional image is an image which represents a virtual 3-D space, and includes an image which is formed confirming to one-point perspective method or two-point perspective method, an image which uses a liquid crystal shutter or a lenticular lens, and a stereographic image which is displayed by applying holographic technology, and the person to be recognized points to a specific position within the virtual 3-D space which is represented by the three dimensional image which is displayed on the display means, and in a state in which the hand of the person to be recognized is determined to be in a specific shape, when the distance between the reference point and the characteristic point changes, the display control means controls the display means such that the three dimensional image displayed on the display means is displayed so as to be enlarged or reduced according to the change in the distance between the reference point and the characteristic point. The fourth aspect of the present invention is structured such that a three dimensional image is displayed on the display means, and the person to be recognized points to the specific position within a virtual 3-D space which is represented by the three dimensional image. A plane display for displaying an image which is formed conforming to a one-point perspective method or two-point perspective method, a 3-D display which uses a liquid crystal shutter or a lenticular lens, and a display apparatus which displays a stereographic image formed through holographic technology can be used for the display means. As described above, when a three dimensional image is displayed on the display means, because the display magnification can be set arbitrarily, it is preferable that the display magnification can be changed by an instruction from the person to be recognized. However, it is necessary to distinguish the action in which the person to be recognized changes the display magnification from the action in which the person to be recognized points to the specific position within the 3-D space.

In the fourth aspect of the present invention, there is provided determining means which determines whether the hand of the person to be recognized is in a specific shape. In a state in which the hand of the person to be recognized is determined to be in a specific shape, when the distance between the reference point and the characteristic point has changed, the display control means controls the display means such that the three dimensional image displayed on the display means is displayed so as to be enlarged or reduced according to the change in the distance between the reference point and the characteristic point. It is desirable that the aforementioned specific shape be easily determined. For example, a hand shape in a state in which the fingers are stretched out so as to open the hand can be used.

Accordingly, in a state in which the hand of the person to be recognized is in a specific shape (a state in which the fingers are stretched out so as to open the hand), when the action of changing the distance between the reference point and the characteristic point (the bending or stretching action of the arm of the person to be recognized) is carried out, this action is distinguished from the action of pointing to the specific position, and the display magnification of a three dimensional image which is displayed on the display means is changed due to the change in the distance between the reference point and the characteristic point so as to be enlarged or reduced. As a result, in accordance with the fourth aspect of the present invention, the display magnification of the three dimensional image displayed on the display means can be reliably changed due to the variation of the display magnification of the three dimensional image which is instructed by the person to be recognized.

The aforementioned display magnification can be changed linearly or non-linearly in response to the change in the distance between the reference point and the characteristic point.

As described above, in the structure in which the 3-D coordinates of the specific position within the 3-D space, which is pointed to by the person to be recognized, preferably, a predetermined process can be executed by the person to be recognized carrying out a specified action (a so-called click action). However, depending upon the direction of the image pickup by the image pickup means, the action of lifting a thumb which has been conventionally adopted as the click action cannot be detected. Further, the degree of freedom in the action of lifting a thumb is very limited as an action. It is also difficult to provide a plurality of meanings for the click action in the same manner as a right click or a left click on a mouse and select a process which is executed by a click action.

For this reason, in accordance with the fifth aspect of the present invention, there is provided a hand pointing apparatus according to the first aspect of the present invention, further comprising: processing means which detects the speed at which the distance between the reference point and the characteristic point changes, and executes a predetermined process when the detected speed at which the distance between the reference point and the characteristic point changes is greater than or equal to a threshold value.

In the fifth aspect of the present invention, if the person to be recognized carries out a quick arm bending or stretching action, the distance between the reference point and the characteristic point changes at a speed which is greater than or equal to a threshold value. By using this changing speed as a trigger, a predetermined process is carried out. Moreover, the processing means can execute a process which is relevant to the specific position which is pointed by the person to be recognized when the distance between the reference point and the characteristic point has changed at the speed which is greater than or equal to the threshold value.

The present invention determines the 3-D coordinates of the specific position which is pointed to by the person to be recognized on the basis of the positional relationship between the reference point and the characteristic point. However, in accordance with the fifth aspect of the present invention, because it is determined whether a predetermined process has been instructed to be executed on the basis of the change of each of the positions of the reference point and the characteristic point, the image pickup direction by the image pickup means can be fixed so that the reference point and the characteristic point can reliably be detected without considering the lifting or lowering action of a finger. As a result, in accordance with the fifth aspect of the present invention, the action by which a predetermined process is instructed by the person to be recognized (the action of quickly bending or stretching the arm of the person to be recognized) can be detected reliably.

There are two types of directions in which the distance between the reference point and the characteristic point changes (the direction in which the distance increases and the direction in which the distance decreases). Accordingly, as described in the sixth aspect of the present invention, when the distance between the reference point and the characteristic point increases at the speed of the change which is greater than or equal to the threshold value, the first predetermined process can be executed, and when the distance between the reference point and the characteristic point decreases at the speed of the change which is greater than or equal to the threshold value, the second predetermined process which is different from the first predetermined process can be executed.

In the sixth aspect of the present invention, the first predetermined process is executed when the person to be recognized carries out the quick action of stretching an arm (in this case, the distance between the reference point and the characteristic point increases at the changing speed which is greater than or equal to the threshold value). The second predetermined process is executed when the person to be recognized carries out a quick action of bending an arm (in this case, when the distance between the reference point and the characteristic point decreases at the changing speed which is greater than or equal to the threshold value). Accordingly, it becomes possible for the person to be recognized to select one of the first and the second processes as in the right click and the left click on the mouse. By performing one of the aforementioned actions, it is possible to reliably execute a process selected from the first predetermined process and the second predetermined process by the person to be recognized.

As described above, because the physique of the person to be recognized is not universal, and accordingly, the muscular strength or the like of the person to be recognized is not universal, even when the person to be recognized carries out a quick arm bending or stretching action in order to cause the processing means to execute a predetermined process, the speed at which the distance between the reference point and the characteristic point changes is different for every individual person to be recognized. As a result, even if the person to be recognized carries out a quick arm bending or stretching action in order to cause the processing means to execute a predetermined process, the bending or stretching action cannot be detected. Instead, it may even be possible that the aforementioned action is detected although the person to be recognized has not carried out this action.

For this reason, the seventh aspect of the present invention is a hand pointing apparatus according to the fifth aspect of the present invention, further comprising: threshold value setting means which requests the person to be recognized to carry out the arm bending or stretching action to cause the processing means to execute the predetermined process, and thereby sets the threshold value in advance on the basis of the speed at which the distance between the reference point and the characteristic point changes when the person to be recognized carries out the arm bending or stretching action.

In the seventh aspect of the present invention, because a threshold value for determining whether the processing means executes a predetermined process is set in advance on the basis of the speed at which the distance between the reference point and the characteristic point changes when the person to be recognized carries out the arm bending or stretching action in order to execute a predetermined process by the processing means, a threshold value according to the physique, the muscular strength or the like for each person to be recognized can be provided. By determining whether a predetermined process is instructed to be executed on the basis of the threshold value, in spite of variations in the physique, the muscular strength or the like for each person to be recognized, it can be reliably detected that the person to be recognized has given an instruction to execute a predetermined process. As a result, a predetermined process can be executed reliably.

BRIEF DESCRIPTION OF THE DRAWINGS

FIG. 3 is a schematic view illustrating an example of the relationship between the illumination range of an illumination apparatus and the image pickup range of a video camera.

FIG. 4 is a perspective view of the information inputting space which illustrates an example of a marking plate.

FIGS. 6A through 6D are flowcharts illustrating the instruction determination process.

FIGS. 7A through 7C are flowcharts illustrating the coordination computing process of a reference point/characteristic point.

FIG. 9 is a flowchart which illustrates the setting process of a click action speed.

FIG. 10A is a timing chart which illustrates the switching on/off of an illumination apparatus A.

FIG. 10B is a timing chart which illustrates the switching on/off of an illumination apparatus B.

FIG. 10C is a timing chart which illustrates the timing of the outputting (capturing) of images obtained by the image pickup of a video camera.

FIG. 13A is an image view illustrating an image of a hand of the information inputting person which is picked up by a video camera.

FIG. 13B is a schematic view which illustrates the retrieval range of grid points for determining the coordinates of a characteristic point and the 3-D coordinates of the characteristic point.

FIG. 14A is an image view of the motion of the information inputting person when the position pointed to is located at a long distance from the person.

FIG. 14B is an image view of the motion of the information inputting person when the position pointed to is located at an intermediate distance from the person.

FIG. 14C is an image view of the motion of the information inputting person when the position pointed to is located at a close distance from the person.

FIG. 16A is an image view illustrating a forward click action.

FIG. 16B is an image view illustrating a backward click action.

FIG. 17A is a plan view of the information inputting space illustrating the determination of the position on the display to which the information inputting person is pointing.

FIG. 17B is a side view of the information inputting space illustrating the determination of the position on the display to which the information inputting person is pointing.

FIG. 18 is a schematic view illustrating the conversion from the distance k between the reference point and the characteristic point of the information inputting person into the distance L (a virtual distance) between the information inputting person and the position which is pointed to by the information inputting person.

FIG. 19A is an image view illustrating an example of a shape of a hand of the information inputting person when the person performs an action to point to a specific position on the display screen.

FIG. 19B is an image view which illustrates an example of a shape of a hand of the information inputting person when the person performs an action to change the display magnification of a three-dimensional image.

DESCRIPTION OF THE PREFERRED EMBODIMENTS

Figure 1:
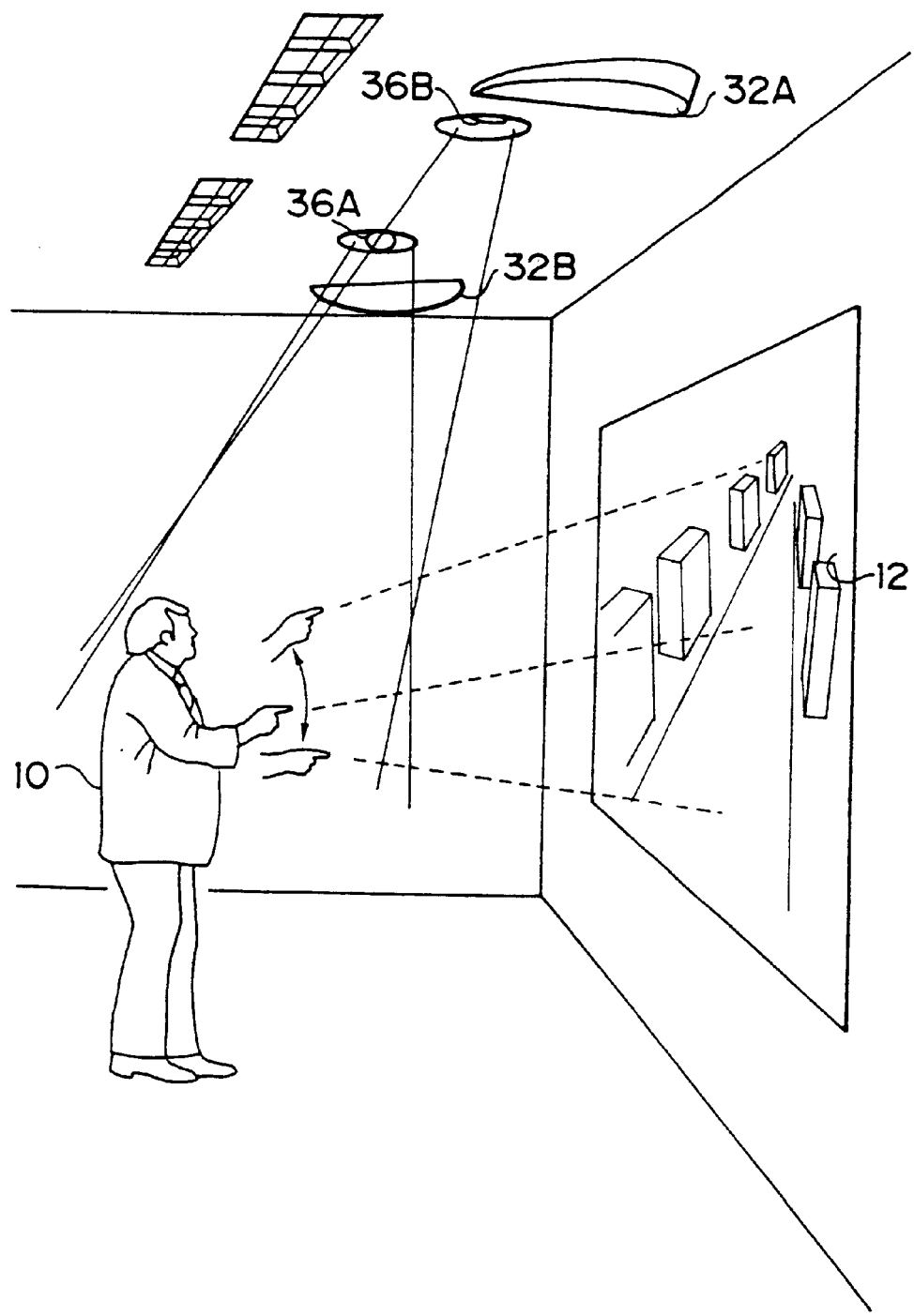
FIG. 1 is a perspective view which illustrates the area surrounding an information inputting space.

With reference to the appended drawings, an example of an embodiment of the present invention will be described in detail hereinafter. As shown in FIG. 1, a large-screen display 12 which corresponds to a display means according to a fourth aspect of the present invention is built into a wall surface in a place where an information inputting person 10, who is the person to be recognized of the present invention, arrives.

The display 12 is used to display a three-dimensional image which virtually represents a three-dimensional space (which is referred to as a 3-D space hereinafter) in accordance with one-point perspective or two-point perspective. Well-known display apparatuses such as a liquid crystal display (LCD), a plasma display, a cathode ray tube (CRT), an optical fiber display and the like can be applied as the display 12. Further, instead of the aforementioned display 12, a 3-D display using a liquid crystal shutter or a lenticular lens, or a display apparatus which displays a stereographic image by applying holographic technology may be used. Moreover, crystal goggles or the like can be applied to the display.

Figure 2:
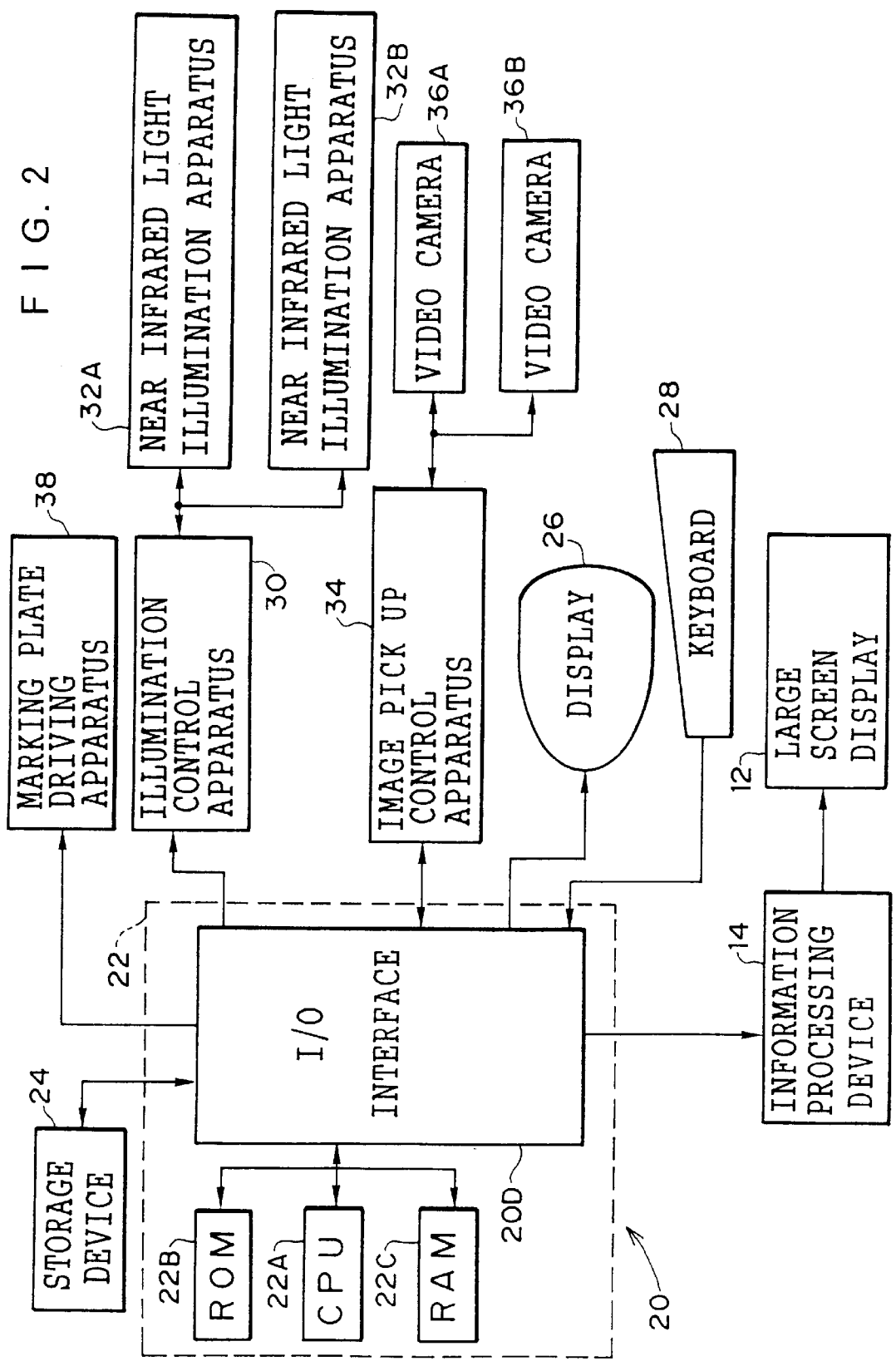
FIG. 2 is a block diagram which illustrates a schematic structure of a hand pointing input apparatus according to an embodiment of the present invention.

The display 12 is connected to an information processing apparatus 14 comprising a personal computer or the like (see FIG. 2). A three-dimensional image is displayed on the display screen, and other information such as a message or the like is also displayed on the screen overlapping the three-dimensional image by the information processing apparatus 14. In the present embodiment, the information inputting person 10 arrives at a space in front of the display 12 which is shown in FIG. 1 (information inputting space). The information inputting person 10 gives various instructions to the information processing apparatus 14 and allows the information processing apparatus 14 to execute various processes by pointing to an arbitrary position within a virtual 3-D space represented by a three-dimensional image which is displayed on the display 12 and by performing a click action (of which details will be described later).

As shown in FIG. 2, a controller 22 of a hand pointing input apparatus 20 according to the present embodiment is connected to the information processing apparatus 14. The controller 22 comprises a CPU 22A, ROM 22B, RAM 22C, and an I/O interface 22D, which are connected to each other via a bus. The information processing apparatus 14 is connected to the I/O interface 22D. A non-volatile storage device 24 whose stored contents are rewritable, a display 26 for displaying various types of information, a keyboard 28 through which an operator inputs various instructions or data, an illumination control apparatus 30, an image pickup control apparatus 34, and a marking plate driving apparatus 38 are also connected to the I/O interface 22D.

A large number of three-dimensional images which are displayed on the display 12 are prepared in advance, and a large number of image data for representing the various three-dimensional images is stored in the storage device 24. Further, coordinate data for representing the relationship between the 3-D coordinates of each of the positions within a virtual 3-D space represented by each of the three-dimensional images and the position (2-D coordinates) of each of the positions on the three-dimensional image is also stored in the storage device 24. Moreover, instead of the coordinate data, the aforementioned relationship may be stored in the form of a functional equation or the like (preferably, it includes a display magnification as a parameter).

A plurality of near-infrared light illumination apparatuses 32A and 32B, which emit beams of a wavelength in the near-infrared range, are connected to the illumination control apparatus 30. As shown in FIG. 1, the near-infrared light illumination apparatuses 32A and 32B are disposed in separated upper portions of the information input space. The illumination ranges of the near-infrared light illumination apparatuses 32A and 32B are controlled such that the information inputting person 10 who arrives in the information inputting space can be illuminated from different directions. The illumination control apparatus 30 controls the switching of the illumination apparatuses 32A and 32B.

A plurality of video cameras 36A and 36B which are disposed in separated upper portions of the information inputting space (see FIG. 1) are connected to the image pickup control apparatus 34. The plurality of the video cameras 36A and 36B have an area sensor which comprises a CCD (not shown) or the like which is sensitive to near-infrared light, and which has a filter which transmits only light of a wavelength in the near-infrared range on a light incident side of an image forming lens which makes incident light form an image on the receptor surface of the area sensor.

As shown in FIG. 3, the orientations of the video cameras 36A and 36B are adjusted so as to pick up images of the information inputting person 10 from different directions. Namely, the orientation (the image pickup range) of the video camera 36A is controlled in such a manner that the information inputting person 10 who arrives in the information inputting space is within the image pickup range, and the light emitted from the illumination apparatus 32A is not directly incident on the image forming lens. Moreover, the central portion of the image pickup range intersects the central portion of the illumination range of the illumination apparatus 32A within the information inputting space at a predetermined height from the floor surface (the illumination range on the floor surface illuminated by the illumination apparatus 32A is out of the image pickup range). Similarly, the orientation (the image pickup range) of the video camera 36B is controlled in such a manner that the information inputting person 10 who arrives in the information who arrives in the information inputting space is within the image pickup range, and the light emitted from the illumination apparatus 32B is not directly incident on the image forming lens. Moreover, the central portion of the image pickup range intersects the central portion of the illumination range of the illumination apparatus 32B within the information inputting space at a predetermined height from the floor surface (the illumination range on the floor surface illuminated by the illumination apparatus 32B is out of the image pickup range).

As shown in FIG. 4, the hand pointing input apparatus 20 has a marking plate 40 which is disposed adjacent to the information inputting space. The marking plate 40 is formed by a large number of marks 40A being recorded on a transparent flat plate in the form of matrix at an equal distance, and it is movable so as to cross the information inputting space along the direction which is orthogonal to the direction in which the marks 40A are lined up (i.e., the direction indicated by arrow A in FIG. 4). The marks 40A are colored with a color which can be easily recognized on the image (for example, a red color). The marking plate driving apparatus 38 which is connected to the I/O interface 22D moves the marking plate 40 along the direction indicated by the arrow A according to the instructions of the controller 22.

Figure 5A:
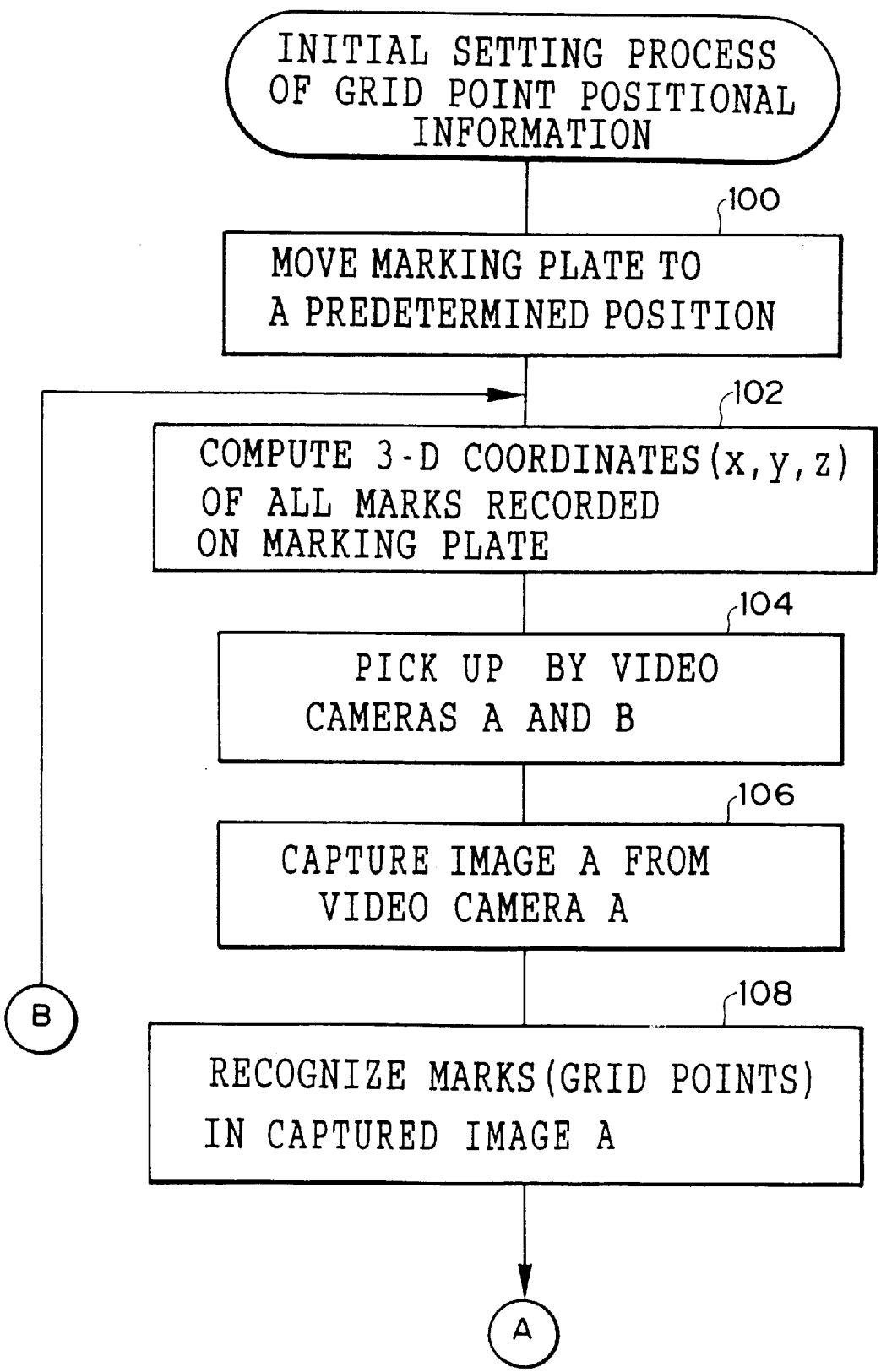
FIGS. 5A through 5C are flowcharts illustrating the initial setting process of the grid point positional information.
Figure 5B:
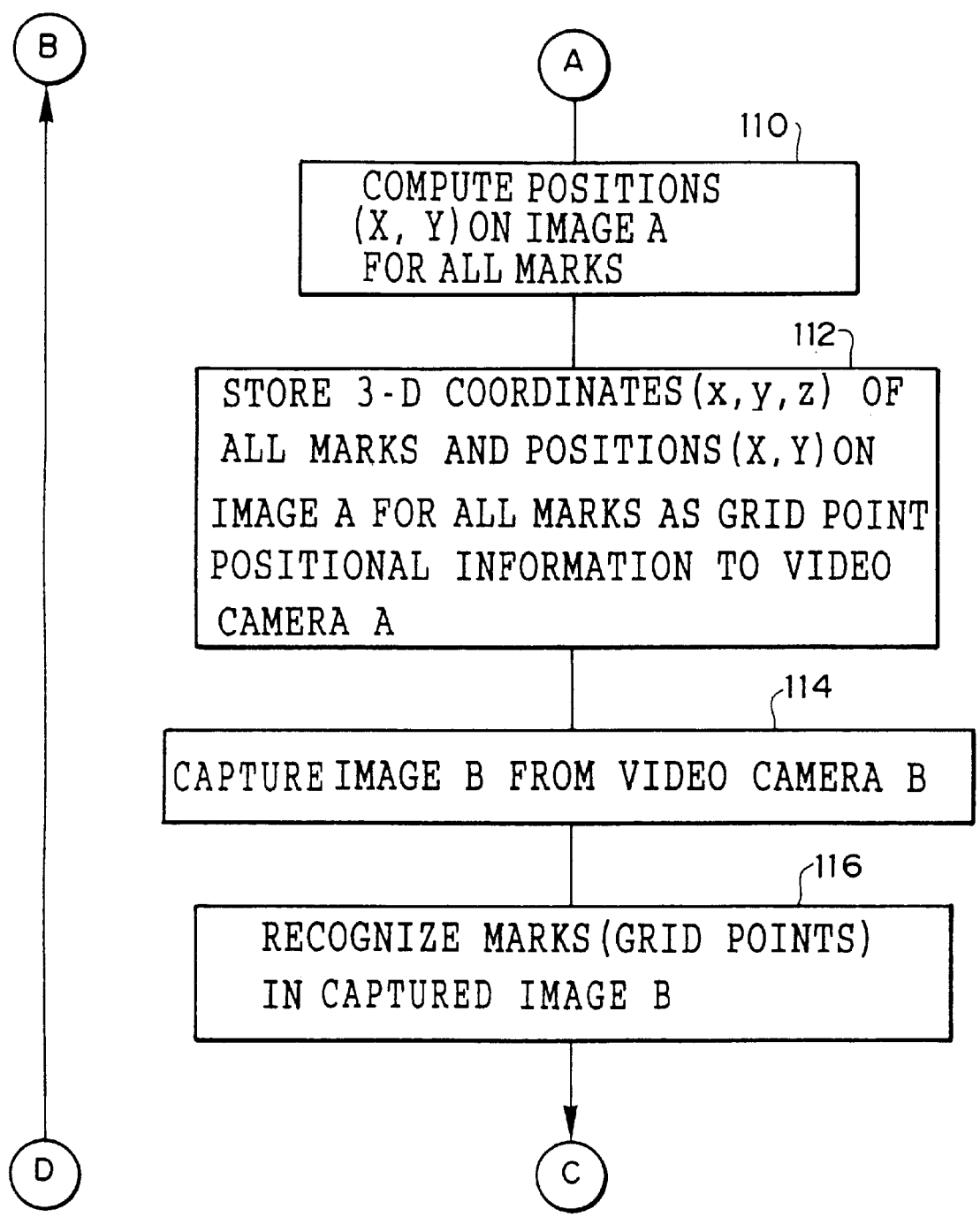
Figure 5C:
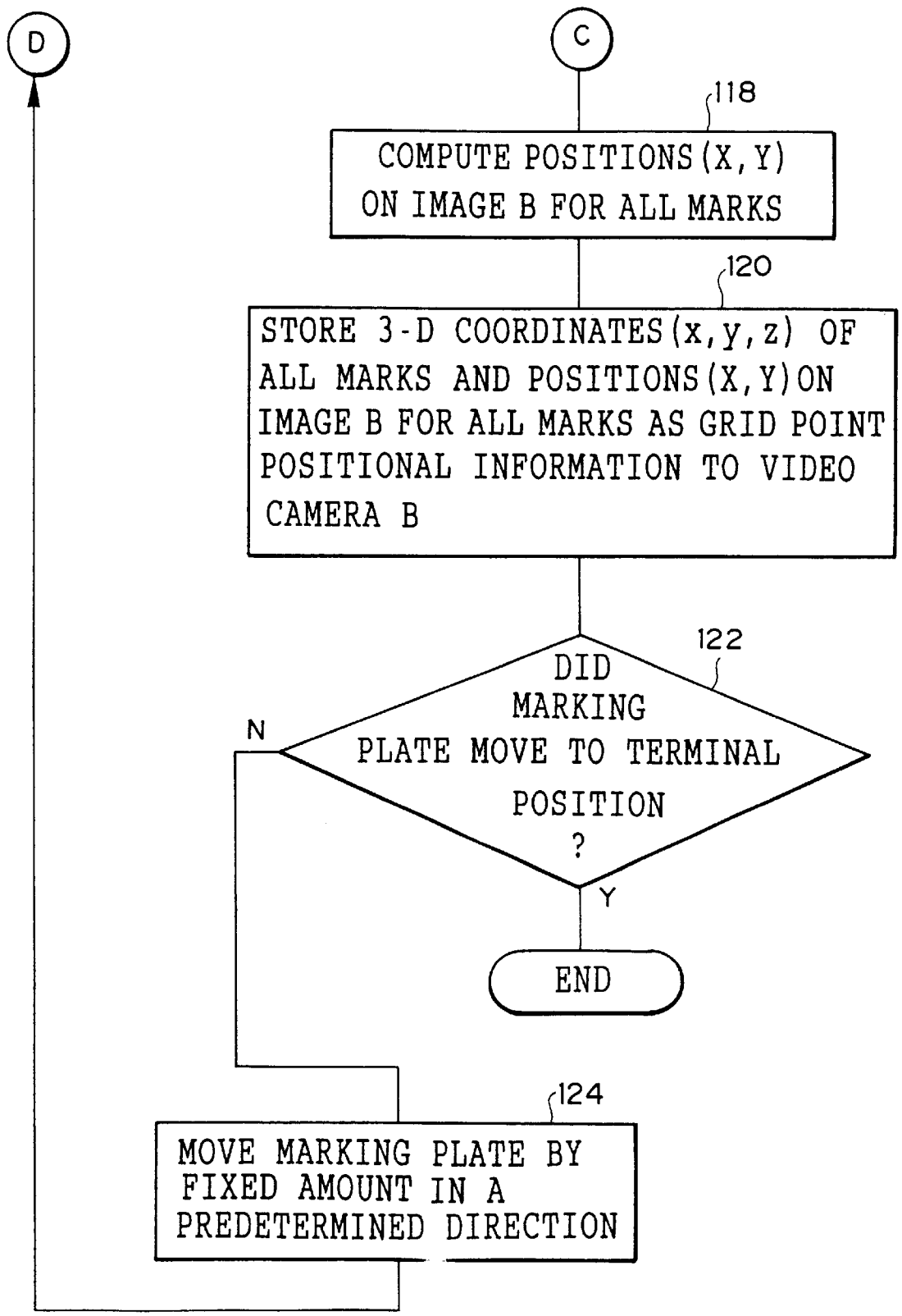
Figure 6A:
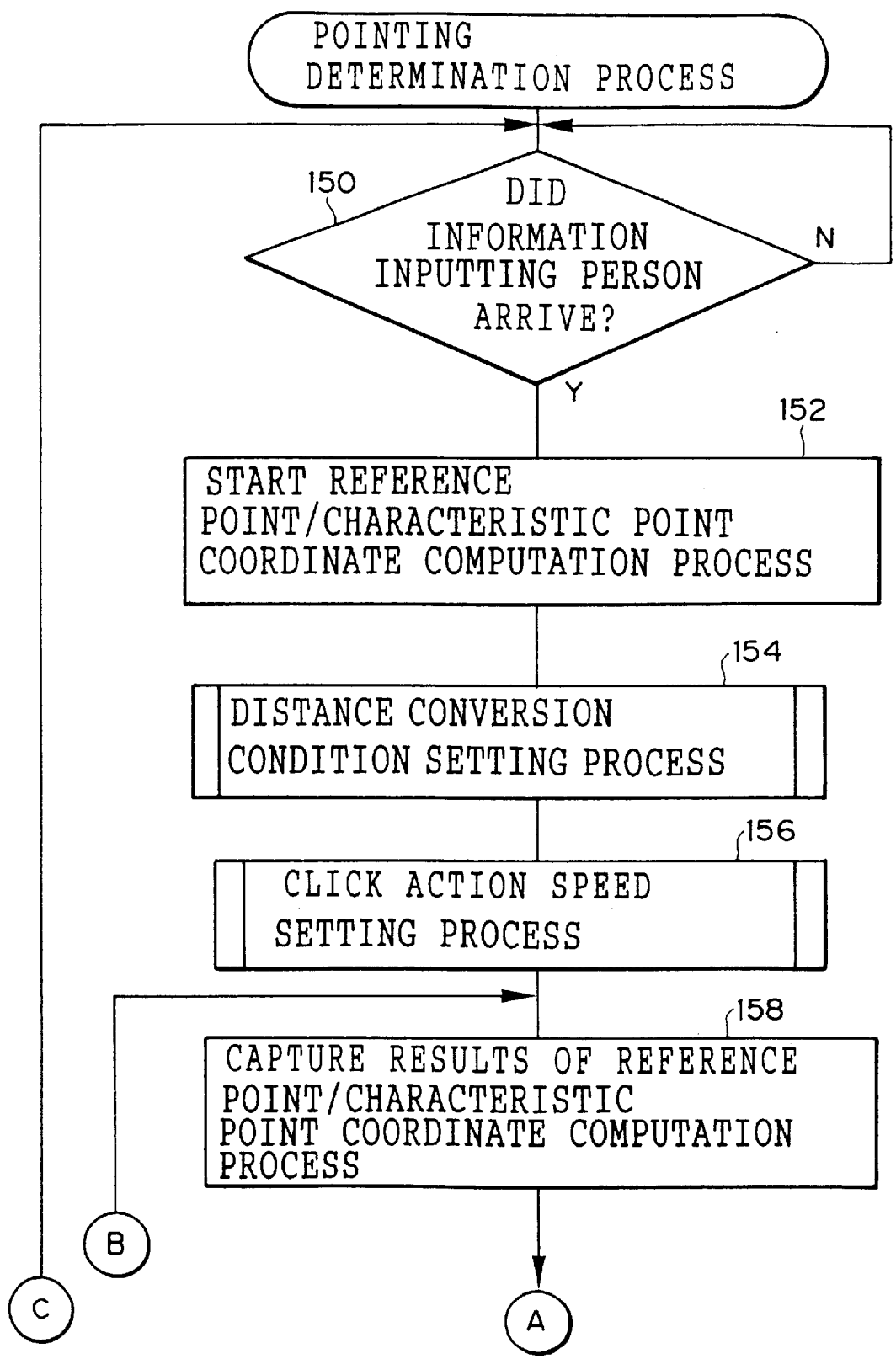
Figure 6D:
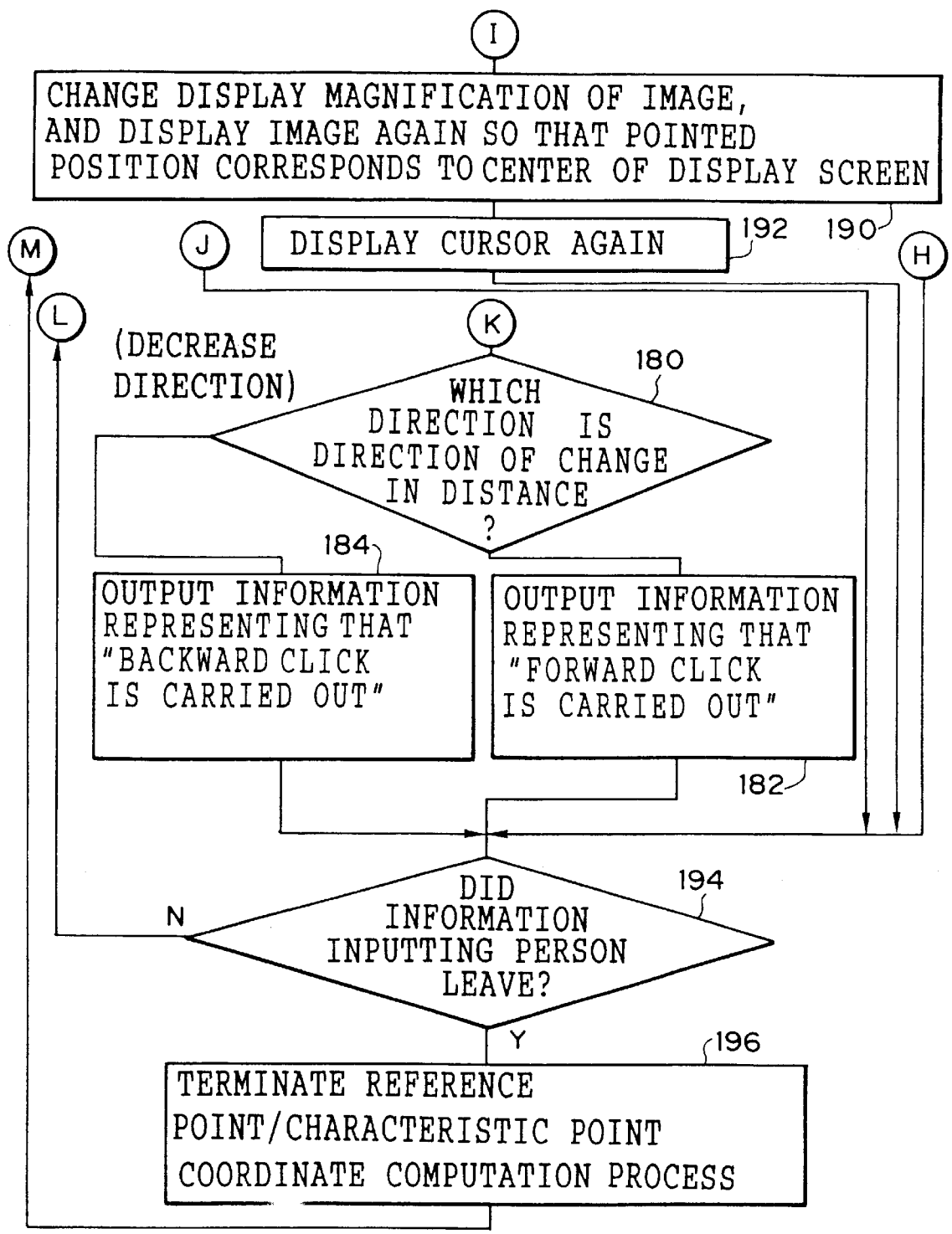

Next, as the operation of the present embodiment, a description of a grid point positional information initial setting process which is effected by the controller 22 when the hand pointing input apparatus 20 is first set up will be given with reference to the flowchart of FIGS. 5A through 5C.

In Step 100, the marking plate 40 is moved to a predetermined position (which corresponds to the limit of the range of movement of the marking plate 40) by the marking plate driving apparatus 38. Next, in Step 102, in the information inputting space, the 3-D coordinates (x, y, z) of each of the large number of marks 40A which are recorded on the marking plate 40 are computed. In Step 104, an image of the information inputting space is picked up by the video cameras 36A and 36B through the image pickup control apparatus 34. Next, in Step 106, the image of the information inputting space picked up by the video camera 36A (the image is referred to as an image A) is captured through the image pickup control apparatus 34.

In Step 108, the recognition (extraction) of the marks 40A existing in the image A which is captured in Step 106 is effected. Next, in Step 110, the positions $(X_A, Y_A)$ on the image A are computed for all of the recognized marks 40A. In Step 112, the 3-D coordinates (x, y, z) within the information inputting space and the positions $(X_A, Y_A)$ on the image A are corresponded to each other for all of the marks 40A which exist in the image A, and are thereby stored in the storage device 24 as the grid point positional information from the video camera 36A.

Next, in Steps 114 to 120, similarly to the above-described Steps 106 to 112, a process for the video camera 36B is executed. Namely, in Step 114, an image of the information inputting space picked up by the video camera 36B (the image is referred to as an image B) is captured through the image pickup control apparatus 34. In Step 116, the recognition (extraction) of the marks 40A existing in the image B which is captured in Step 114 is effected. Next, in Step 118, the positions $(X_B, Y_B)$ on the image B are computed for all of the recognized marks 40A. In Step 120, the 3-D coordinates (x, y, z) within the information inputting space and the positions $(X_B, Y_B)$ on the image B are corresponded to each other for all of the marks 40A which exist in the image B, and are thereby stored in the storage device 24 as the grid point positional information from the video camera 36B.

Next, in Step 122, it is determined whether the marking plate 20 is moved to its terminal position (i.e., the position which corresponds to the end opposite to the predetermined portion in Step 100, within the moving range of the marking plate 40). If the determination is negative in Step 122, the routine proceeds to Step 124, where after the marking plate 40 has been moved by the marking plate driving apparatus 38 in a predetermined direction by a fixed distance (the distance which corresponds to the distances between the marks 40A on the marking plate 40), the routine returns to Step 102.

As described above, until the marking plate 40 is moved to the aforementioned terminal portion, Steps 102 to 124 are repeated so that a large number of the marks 40A which are recorded on the marking plate 40 are moved to the positions corresponding to a large number of grid points which are lined up in a lattice shape. Then, for all of the marks 40A, the 3-D coordinates of each of the grid points within the information inputting space are corresponded to the positions on the image A, as the grid point positional information of the video camera 36A, and the marks are stored in the storage device 24. In the same way, for all of the marks 40A, the 3-D coordinates of each of the grid points within the information inputting space are corresponded to the positions on the image B, as the grid point positional information of the video camera 36B, and the marks are stored in the storage device 24.

Further, because the marking plate 40 and the marking plate driving apparatus 38 are used merely for the aforementioned grid point positional information initial setting process and not used for the process which will be described later, after the above-described process has been effected, the marking plate 40 and the marking plate driving apparatus 38 can be removed.

Instead of the marking plate 40 on which the marks 40A are recorded, the above-described process may be effected by using a transparent, flat marking plate on which a large number of light emitting elements such as LEDs or the like are disposed in the form of a matrix. Namely, the marking plate is moved in steps of a fixed distance, and the sequential switching on of the large number of light emitting elements is repeated at each of the positions in the step movement. Further, in order to effect the above-described process, a robot arm apparatus in which light emitting elements are mounted to a hand thereof and the hand is movable to any position within the information inputting space can be used by moving the light emitting elements to each of the positions corresponding to each of the grid point positions by the robot arm apparatus and by repeatedly switching on the light emitting elements.

Next, with reference to the flowchart in FIGS. 6A through 6D, a description of the pointing determination process will be given hereinafter. The pointing determination process is effected regularly by the controller 22 after the above-described grid point positional information initial setting process has been effected. Further, the pointing determination process is provided to determine the pointing inputted by the information inputting person 10 who arrives in the information inputting space.

In Step 150, the image data representing the image A which is outputted from the video camera 36A and the image data representing the image B which is outputted from the video camera 36B are respectively captured, and on the basis of the image data from the captured images A and B, it is determined whether the information inputting person 10 has arrived in (or exists within) the information inputting space.

During the pointing determination process by the controller 22, as shown in FIGS. 10A to 10C, the illumination control apparatus 30 switches on the illumination apparatuses 32A and 32B, alternately. Accordingly, the image pickup control apparatus 34 controls the video camera 36A to pick up the image of the information inputting space while the illumination apparatus 32A is switched on, and controls the video camera 36B to pick up the image of the information inputting space while the illumination apparatus 32B is switched on.

Since the image pickup range of the video camera 36A is controlled such that the illumination range on the floor surface illuminated by the illumination apparatus 32A is out of the image pickup range, even when there exists an object 50A which is not the subject to be recognized such as the baggage of the information inputting person 10, or rubbish or the like (see FIG. 3) on the floor surface within the illumination range of the illumination apparatus 32A, the object 50A which is not the subject to be recognized never enters into the image pickup range of the video camera 36A. Further, if an object B which is not the subject to be recognized (see FIG. 3) is present on the floor surface within the image pickup range of the video camera 36A, since the object 50B which is not the subject to be recognized is out of the illumination range of the illumination apparatus 32A, the luminance of the image portion corresponding to the object 50B which is not the subject to be recognized in the image A is extremely low.

Similarly, since the image pickup range of the video camera 36B is controlled such that the illumination range on the floor surface illuminated by the illumination apparatus 32B is out of the image pickup range, even when there exists an object 50B which is not the subject to be recognized such as the baggage of the information inputting person 10, or rubbish or the like (see FIG. 3) within the illumination range on the floor surface of the illumination apparatus 33, the object 50B which is not the subject to be recognized never enters into the image pickup range of the video camera 36B. Further, if an object 50A which is not the subject to be recognized is present on the floor surface within the image pickup range of the video camera 36B, since the object 50A which is not the subject to be recognized is out of the illumination range of the illumination apparatus 32B, the luminance of the image portion corresponding to the object 50A which is not the subject to be recognized in the image B is extremely low.

Accordingly, the determination in the above-described Step 150 can be effected by an extremely simple determination as to whether or not the image portion of the image A or B, for example, has a high luminance and has an area of a predetermined value or more. When the determination is negative in Step 150, the routine is kept in a waiting state until the determination is affirmative.

Figure 7A:
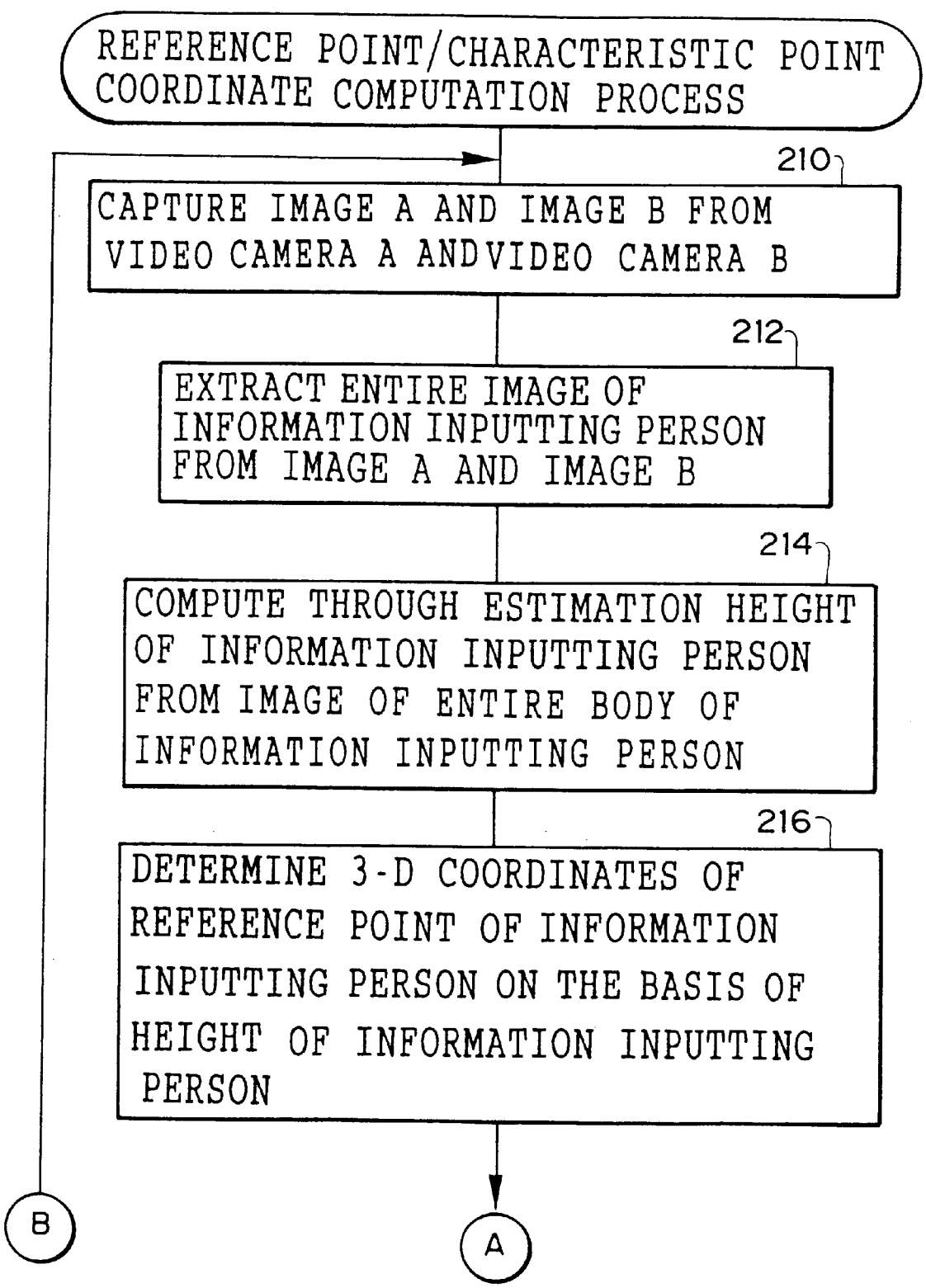
Figure 7B:
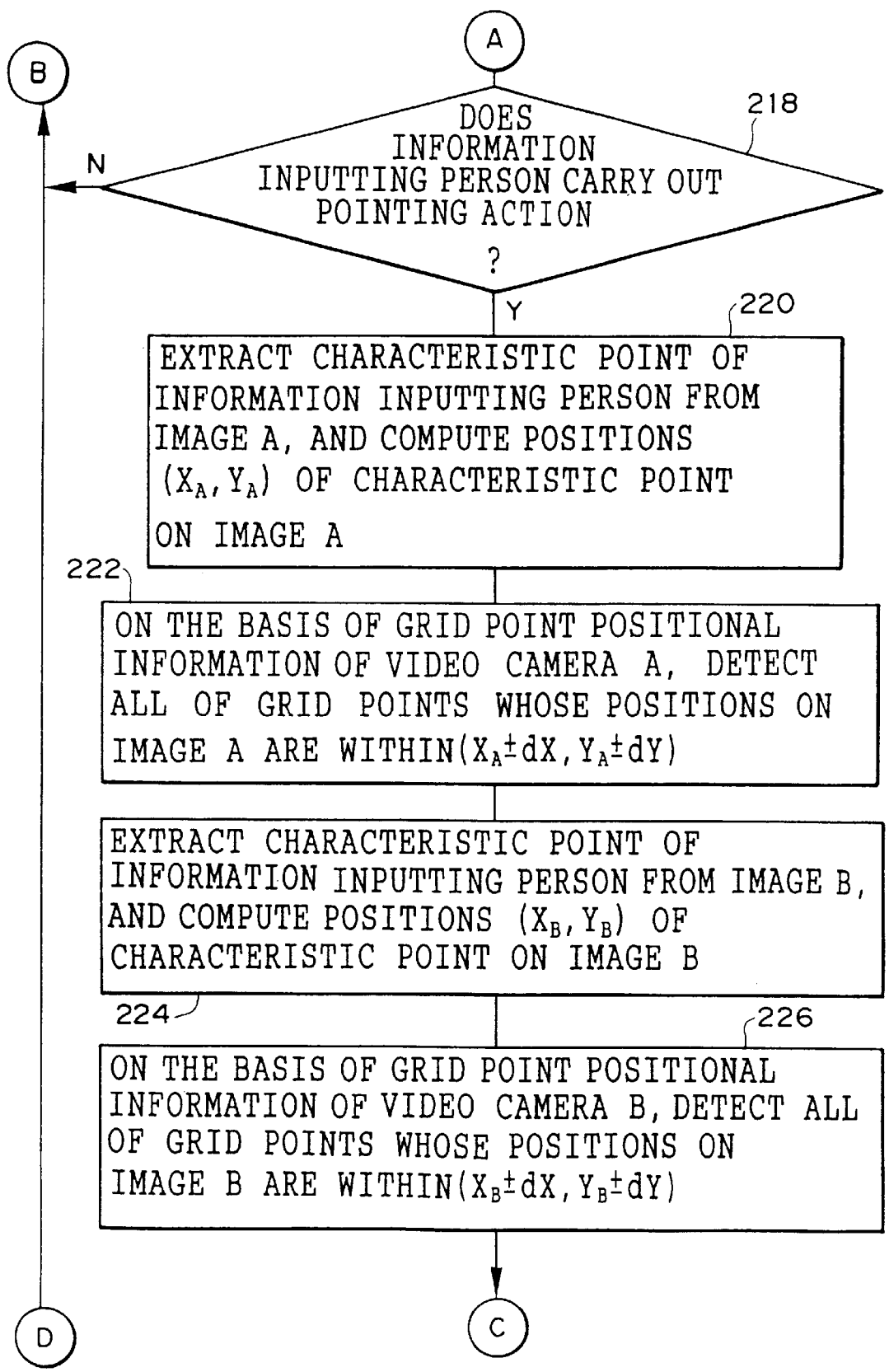

When the information inputting person 10 comes into the information inputting space, the determination in Step 150 is affirmative and the routine proceeds to Step 152, where a reference point/characteristic point coordinate computation process is started. This process corresponds to the computing means according to the present invention, and in the controller 22, it is executed concurrently with the determination process. Hereinafter, a description of the reference point/characteristic point coordinate computation process will be given with reference to the flowchart in FIGS. 7A through 7C.

In Step 210, data for each of the image A and the image B is captured from each of the video cameras 36A and 36B. In Step 212, the image portion which corresponds to the entire image of the information inputting person 10 is extracted from each of the captured images A and B. The image portion which corresponds to the entire image of the information inputting person 10 can be easily extracted by detecting the continuous areas of high luminance pixels larger than an area of a predetermined size.

Figure 11:
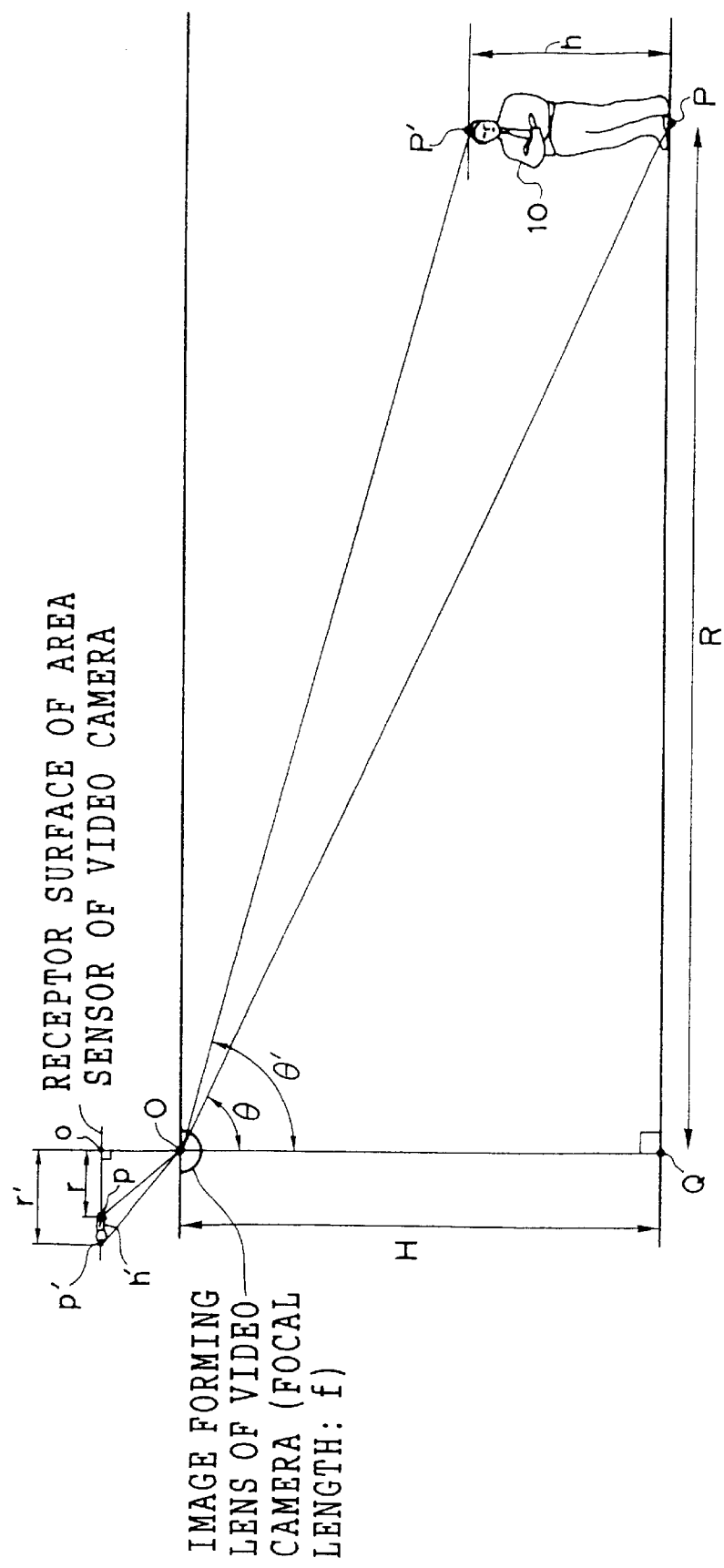
FIG. 11 is a side view of the information inputting space for illustrating the computation of the height of an information inputting person and the position of the person on the floor.

In Step 214, the height of the information inputting person 10 is determined on the basis of the image portion which corresponds to the image of the entire body of the information inputting person 10. As shown in FIG. 11, f denotes a focal length of the image forming lens of the video camera 36 positioned at a point O, H denotes the distance between an intersection point Q of a vertical line passing through the point O, H denotes the floor surface of the information inputting space and the point O, R denotes the distance between the point Q and a point P on the floor surface on which the information inputting person 10 is standing, and the distance h, between a point P' which corresponds to the top of the head of the information inputting person 10 and the point P, denotes the height of the information inputting person 10. Further, when an angle which is formed by the points P, O, and Q is $\theta$, an angle which is formed by the points P', O, and Q is $\theta'$, the length of the image of the information inputting person 10 which is formed on the receptor surface of the area sensor of the video camera 36 is h', a point p denotes an image forming point on the receptor surface which corresponds to the point P, a point p' denotes an image forming point on the receptor surface which corresponds to the point P', r denotes the distance between the center o of the receptor surface and the point p', and r' denotes the distance between the center o of the receptor surface and the point p', the angles $\theta$, $\theta'$ and the distances r, r' are determined from the following equations (1) to (4);

$$\theta = \tan^{-1}(R/H) \quad (1)$$

$$\theta' = \tan^{-1}\{R/(H-h)\} \quad (2)$$

$$r = f\theta \quad (3)$$

$$r' = f\theta' \quad (4)$$

Therefore, the height h of the information inputting person 10 and the distance R can be determined by the following equations (5) and (6);

$$h = H\{1 - \tan(r/f)/\tan(r'/f)\} \quad (5)$$

$$R = H\tan(r/f) \quad (6)$$

Because the distance H and the focal length f are already known, in Step 214, the distances r and r' are determined from one of the image A and the image B picked up by the video cameras 36A and 36B, and these determined distances r and r' are substituted in the equation (5), whereby the height h of the information inputting person 10 can be determined. Further, in Step 214, the distance r is determined from each of the images A and B, and each distance r is then substituted in the equation (6) so that each of the distances R is determined, whereby the position (2-D coordinates) of the information inputting person 10 on the floor surface can be determined.

Next, in Step 216, the 3-D coordinates ($x_0$, $y_0$, $z_0$) of a reference point $P_0$ of the information inputting person 10 is determined on the basis of the height h of the information inputting person 10, and the position of the information inputting person 10 on the floor surface as determined in Step 214. Moreover, the point (i.e., the point $P_0$ which is shown in FIG. 17) which corresponds to, for example, the back of the information inputting person 10 can be used for the reference point $P_0$. In this case, the height (e.g., the value $z_0$) between the reference point $P_0$ which corresponds to, for example, the back of the information inputting person 10 and the floor surface is calculated on the basis of the height h of the information inputting person 10 and the position of the information inputting person 10 on the floor (plane coordinates) is set as the plane coordinates (for example, the values of $x_0$ and $y_0$), whereby the 3-D coordinates for the reference point $P_0$ can be determined. Instead of the point which corresponds to the back of the information inputting person 10, a point corresponding to the chest of the information inputting person 10, a point corresponding to the shoulder joint of the information inputting person 10, or the like can be used.

In Step 218, on the basis of the configuration of the image portion which corresponds to the whole body image of the information inputting person 10 on the image A and the image B, it is determined whether the information inputting person 10 is pointing (i.e., performing a pointing action) to the display 12 with his or her finger. Because the direction of the display 12 as seen by the information inputting person 10 is already known, the determination in Step 218 can be accomplished by, for example, determining whether or not the portion projecting toward the display 12, as seen from the information inputting person 10 is present at the height determinable as the position of the hand of the information inputting person 10, in the image portion corresponding to the full-length image of the information inputting person 10.

Figures 12A, 12B, 12C:
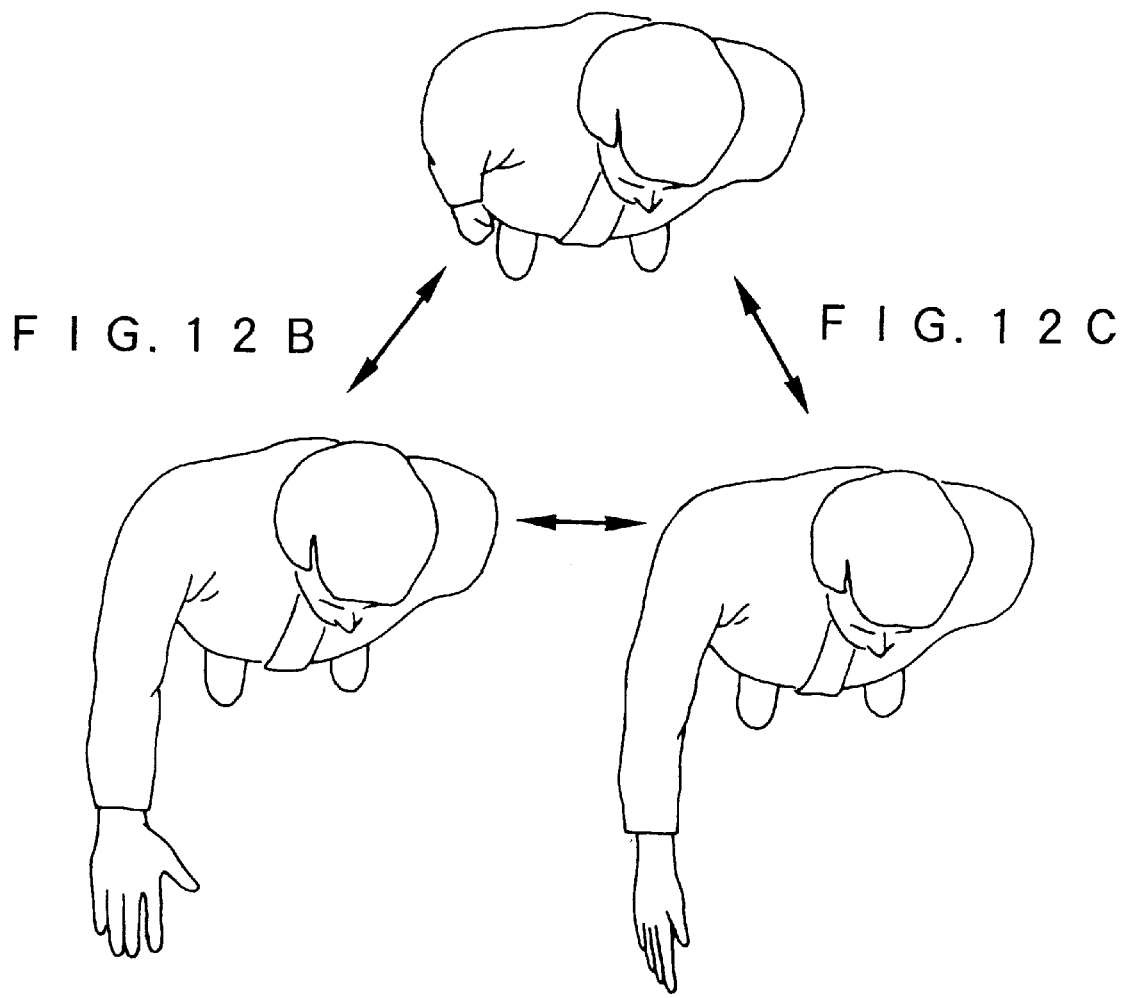
FIGS. 12A through 12C are image views illustrating an example of the motion of the information inputting person.

Therefore, from a state in which the person 10 is standing upright (FIG. 12A), when the information inputting person 10 lifts his or her hand and directs the hand toward the display 12, it can be determined that the information inputting person 10 is carrying out a pointing action. When the determination is negative in Step 218, the 3-D coordinates for the characteristic point (which will be later described in more detail) are not computed and the routine returns to Step 210. Steps 210 to 218 are repeated until the information inputting person 10 carries out a pointing action.

When the information inputting person 10 carries out the pointing action, the determination in Step 218 is affirmative, and the routine proceeds to Step 220. In Step 220, on the basis of the image data representing the captured image A from the video camera 36A, the characteristic point $P_X$ of the information inputting person 10 within the image A is extracted, and the positions ($X_A$, $Y_A$) of the characteristic point $P_X$ on the image A are thereby computed. Points or the like which correspond to the tip of the finger which is pointing toward the display 12 can be used for the characteristic point $P_X$ of the information inputting person 10. In this case, within the image portion representing the image of the entire body of the information inputting person 10, the position of the tip of the portion projecting toward the display 12 from the height position which can be determined to correspond to the hand of the information inputting person 10 can be computed as the position of the characteristic point $P_X$.

Accordingly, when the image of the hand of the information inputting person 10 is picked up by the video camera 36A as shown in FIG. 13A, the coordinates ($X_A$, $Y_A$) of the characteristic point $P_X$ are computed as the position of the characteristic point $P_X$.

In Step 222, on the basis of the grid point positional information of the video camera 36A which is stored in the storage device 24, all of the grid points whose positions on the image A are within the range of ($X_A \pm dX$, $Y_A \pm dY$) (see the range circled by a section line in FIG. 13B) are detected. Further, the magnitude of each of dX and dY are determined on the basis of the distances between grid points (i.e., the distances between the marks 40A) such that one or more of the grid points is extracted.

Further, in the present embodiment, a wide angle lens is used for an image forming lens of the video cameras, and provided that dX and dY are fixed values, a large number of grid points are contained within the range of ($X_A \pm dX$, $Y_A \pm dY$), which leads to a decrease in the accuracy of computing the 3-D coordinates of the characteristic point $P_X$ which will be described later. For this reason, dX and dY are set such that the further the distance from dX and dY to the video camera on the 3-D coordinates, the smaller the values. Accordingly, the range which is equal to ($X_A \pm dX$, $Y_A \pm dY$) on the 3-D coordinates forms a conical shape (or a conical ellipse shape) whose bottom surface is disposed on the side of the video camera.

In Step 224; in the same manner as the aforementioned Step 220, on the basis of the image data which represents the image B which is captured from the video camera 36B, the characteristic point $P_X$ of the information inputting person 10, within the image B is extracted, and the position ($X_B$, $Y_B$) of the characteristic point $P_X$ on the image B is computed. In Step 226, in the same manner as the aforementioned Step 222, all of the grid points within the range of ($X_B \pm dX$, $Y_B \pm dY$) are detected on the basis of the grid point positional information of the video camera 36B which is stored in the storage device 24.

Next, in Step 228, the common grid points which are extracted from the image A and the image B are determined. Accordingly, only the plurality of the grid points which are disposed adjacent to the characteristic point $P_X$ within the information inputting space are extracted. In Step 230, the 3-D coordinates of the common grid points extracted from the image A and the image B are captured from the grid point positional information.

In the present embodiment, as will be described later, the 3-D coordinates of the characteristic point $P_X$ are computed through interpolation from the 3-D coordinates of the plurality of grid points which exist adjacent to the characteristic point $P_X$ in the information inputting space (in more detail, the coordinate values of the 3-D coordinates of the characteristic point are determined by the weighted mean value of the coordinate values of 3-D coordinates of the plurality of grid points). For this reason, previous to the computation of the 3-D coordinates of the characteristic point $P_X$, in the following Step 232, on the basis of the positions on the image A and the image B of each of the common grid points which are extracted from the image A and the image B, the position ($X_A$, $Y_A$) of the characteristic point $P_X$ on the image A, and the position ($X_B$, $Y_B$) of the characteristic point $P_X$ on the image B, the interpolation ratio (the weighting for the coordinate values of the 3-D coordinates of each of the grid points) is determined from the 3-D coordinates of each of the common grid points which are extracted from the image A and the image B. For example, the interpolation ratio can be determined such that the weighting for the coordinate values of the 3-D coordinates of each of the grid points which are disposed adjacent to the characteristic point on the image A and the image B may be increased.

In Step 234, the 3-D coordinates ($X_X$, $Y_X$, $Z_X$) of the characteristic point $P_X$ are computed on the basis of 3-D coordinates of the common grid points which are extracted from the image A and the image B, and the interpolation ratio which is determined in the aforementioned Step 232. As described above, the 3-D coordinates ($X_X$, $Y_X$, $Z_X$) of the characteristic point $P_X$ are computed, and thereafter, the routine returns to Step 210, where the processes from Step 210 are repeated. In this way, in the reference point/characteristic point coordinates computation process, because the reference point $P_0$ and the characteristic point $P_X$ of the information inputting person 10 (provided that the information inputting person 10 is carrying out a pointing action) are computed repeatedly, the values of 3-D coordinates of the reference point $P_0$ and the characteristic point $P_X$ which are computed by the reference point/characteristic point coordinate computation process are sequentially renewed in response to a change in the posture or the motion of the information inputting person 10.

Figure 8A:
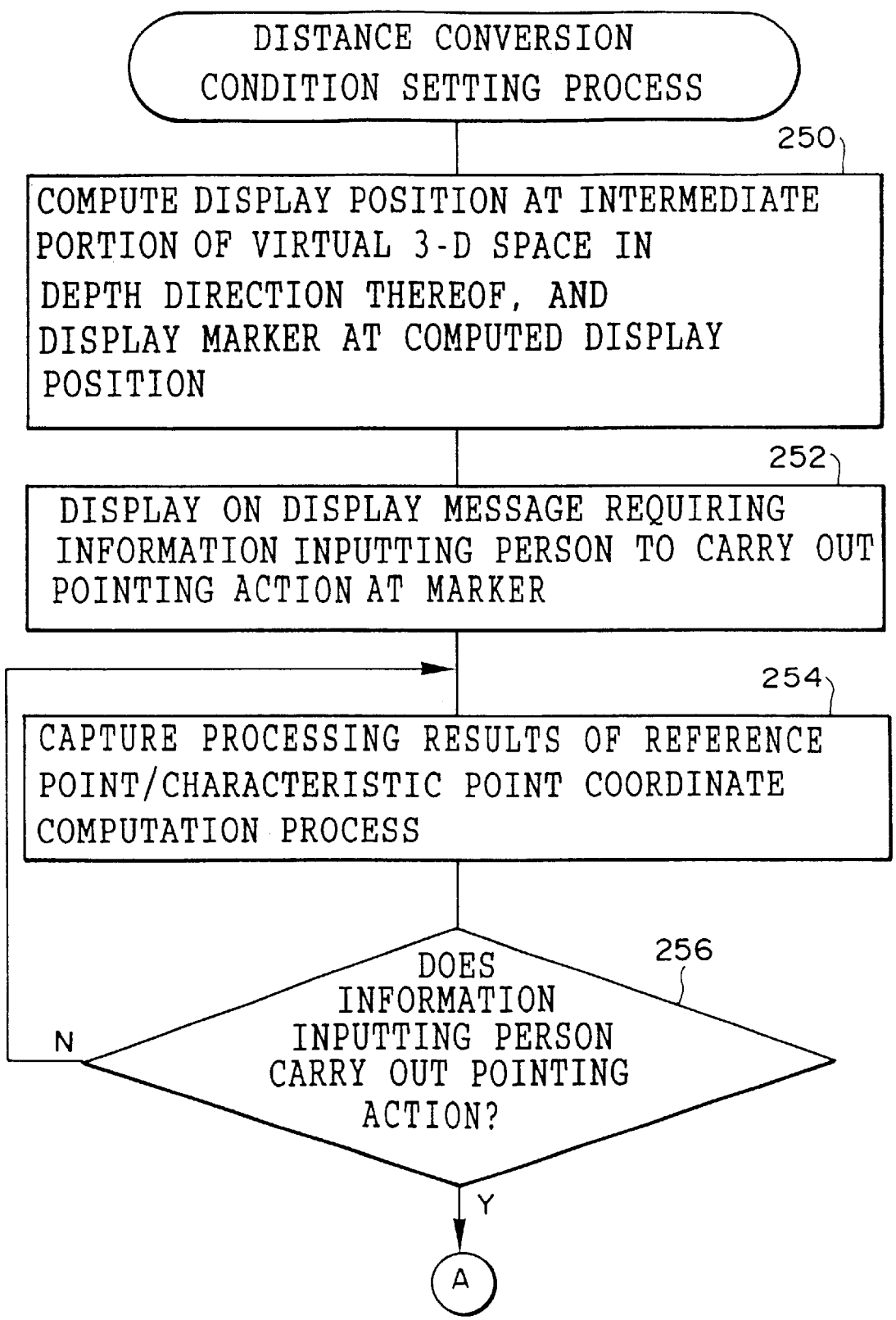
FIGS. 8A through 8C are flowcharts illustrating the setting process of the distance conversion conditions.
Figure 8B:
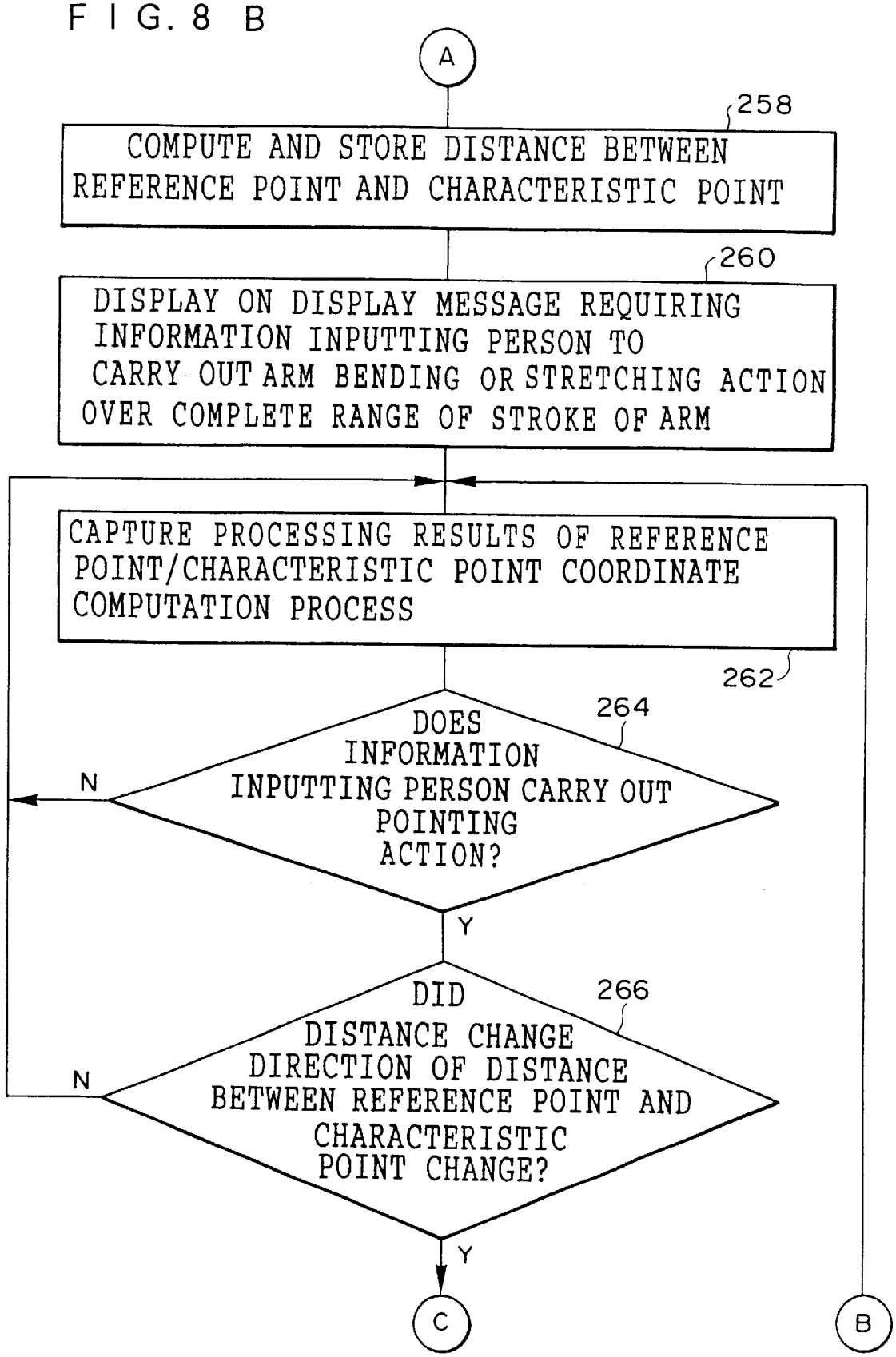
Figure 8C:
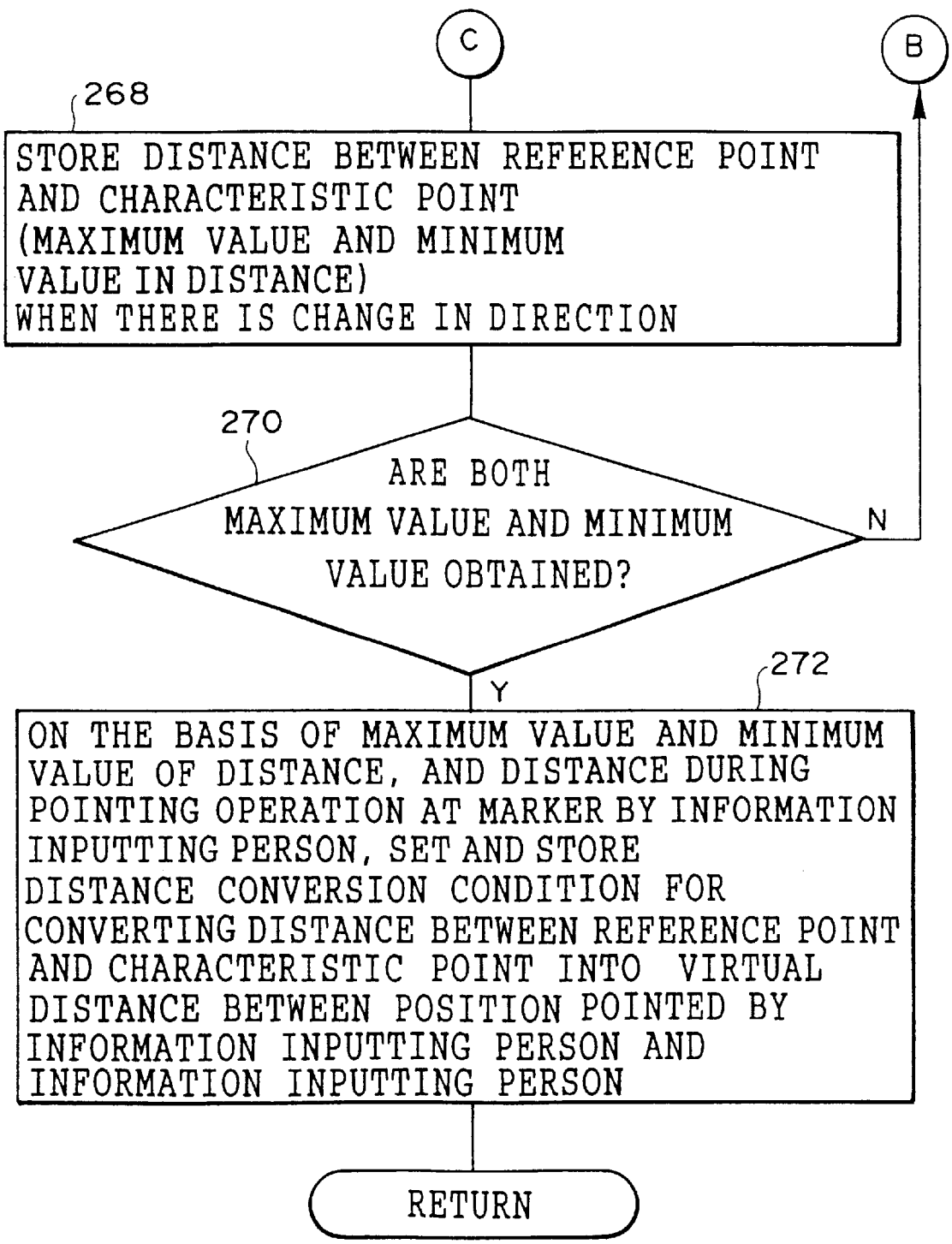

The controller 22 starts the reference point/characteristic point coordinate computation process in Step 152 of the pointing determination process (FIGS. 6A through 6D), and thereafter, executes the processes downward from Step 154 in the pointing determination process concurrently with the aforementioned reference point/characteristic point coordinate computation process. Namely, in Step 154, the controller 22 executes a distance conversion conditions setting process. A description of the distance conversion conditions setting process will be given with reference to the flowchart of FIGS. 8A through 8C. Further, the distance conversion conditions setting process corresponds to the conversion conditions setting means of the third aspect of the present invention.

In Step 250, in a virtual 3-D space represented by a three dimensional image displayed on the display 12, the 3-D coordinates at a position which corresponds to a substantially intermediate position (i.e., the neutral point) of the virtual 3-D space in the depth direction thereof, as seen from the information inputting person 10, is determined on the basis of the coordinate data or the like which is stored in the storage device 24 (which may also be computed by a functional equation), and the position of the neutral point on the display screen of the display 12 (display position of the neutral point) is computed, and the information processing apparatus 14 is instructed to display a marker on the display position which has been computed on the displaying screen of the display 12.

Therefore, the information processing apparatus 14 displays the marker at the display position on the display screen of the display 12, the displayed marker may be visible to the information inputting person 10 as if it were positioned at the neutral point of the virtual 3-D space. Moreover, a circular cursor 52 which is shown in FIG. 18 or the like can be used for the marker. However, any configuration of a marker can be employed if it satisfies the conditions under which the information inputting person 10 can easily recognize the configuration.

Next, in Step 252, the information processing apparatus 14 is instructed to display on the display 12, a message which requires the information inputting person 10 to carry out a pointing action at the marker displayed on the display 12. Accordingly, the information processing apparatus 14 displays the message on the display 12, and the information inputting person 10 in a state in which the person 10 is standing upright (FIG. 12A), lifts his hand and directs the hand toward the display 12, and in the direction of the marker in the virtual 3-D space represented by a three dimensional image displayed on the display 12, and bends or stretches his or her arm in accordance with the distance to the marker in the virtual 3-D space.

When the information inputting person 10 points to an object which has been recognized by the information inputting person 10 to be located at a distant position in the virtual 3-D space, the person 10 stretches out his or her arm (see FIG. 14A). When the information inputting person 10 points to an object which has been recognized by the information inputting person 10 to be located adjacent to him or her, the person 10 bends his or her arm (see FIG. 14C). As described above, because the marker can be seen as if it were positioned at a neutral point in the virtual 3-D space, in the action of pointing to the marker, the information inputting person 10's arm is in a half-bent state as shown in FIG. 14B.

In Step 254, the results (3-D coordinates of the reference point $P_0$ and the characteristic point $P_X$) of the reference point/characteristic point coordinate computation process are captured, and in Step 256, it is determined whether the information inputting person 10 carries out the pointing action by pointing to the display screen of the display 12. In the reference point/characteristic point coordinate computation process, since the 3-D coordinates of the characteristic point $P_X$ are computed only when the information inputting person 10 carries out the pointing action (i.e., when the determination in Step 218 is affirmative), the determination in Step 256 is effected by determining whether 3-D coordinates of the characteristic point $P_X$ are computed.

When the determination is negative in Step 256, the routine returns to Step 254, and Step 254 and Step 256 are repeated until the information inputting person 10 carries out the pointing action. When the determination in Step 256 is affirmative, the routine proceeds to Step 258, where the distance k between the reference point $P_0$ and the characteristic point $P_X$ is computed from the 3-D coordinates of the reference point $P_0$ and the characteristic point $P_X$ which are captured in Step 254. The distance k is corresponded to the distance $L_{mid}$ (virtual distance) between the information inputting person 10 and the neutral point in the virtual 3-D space containing the information inputting person 10, and is stored in the storage device as a distance $k_{mid}$.

Next, in Step 260, the distance conversion conditions setting process instructs the information processing apparatus 14 to display on the display 12, a message which requires the information inputting person 10 to carry out an arm bending or stretching action over the complete range of the stroke of the arm. Accordingly, the information processing apparatus 14 displays the message on the display 12. The information inputting person 10 repeats the stretching motion in which the information inputting person 10 stretches an arm out straight and the bending action in which the information inputting person 10 bends an arm.

Next, in Step 262, the distance conversion conditions setting process captures the process results of the reference point/characteristic point coordinate computation process. In Step 264, it is determined whether the information inputting person 10 carries out the action of pointing to the display screen of the display 12. When the determination is negative in Step 264, the routine returns to Step 262. Step 264 and Step 262 are repeated until the information inputting person 10 carries out the pointing action. When the determination in Step 264 is affirmative, the routine proceeds to Step 266.

In Step 266, the distance k between the reference point $P_0$ and the characteristic point $P_X$ is computed on the basis of the 3-D coordinates of the reference point $P_0$ and the characteristic point $P_X$ which are captured in Step 262, and is stored and it is determined whether any change in the distance k exists and whether the direction of the change in the distance k changes from an increasing direction to a decreasing direction, or from a decreasing direction to an increasing direction. The determination will be unconditionally that no change exists when Step 266 is executed for the first time and the second time. However, when Step 266 is executed for the second time and thereafter, the value of the distance k which is computed this time is compared to the values of the distance k which has been computed for the previous times, and the changing direction of the distance k is determined. When Step 266 is executed for the third time and thereafter, the aforementioned determination is carried out by comparing the direction of the change in the distance k determined during the current determination with the direction of the change in the distance k determined during the previous determination.

When the aforementioned determination is that no change exists, the routine returns to Step 262, and Steps 262 to 266 are repeated. On the other hand, when there is a change in the direction of the distance k, the information inputting person 10's arm may be substantially in a stretched out straight state (see FIG. 14A) or in a bent state (see FIG. 14C). Accordingly, the determination in Step 266 is affirmative, and the routine proceeds to Step 268, where the distance k between the reference point $P_0$ and the characteristic point $P_X$ at this time (the distance k shows a maximum value in a state in which the information inputting person 10's arm is stretched out straight, and a minimum value in a state in which the information inputting person 10's arm is bent) is stored. Next, in Step 270, it is determined whether both the maximum value $k_{max}$ and the minimum value $k_{min}$ are obtained. If the determination is negative in Step 270, the routine goes back to Step 262, and Steps 262 to 270 are repeated.

Figure 15:
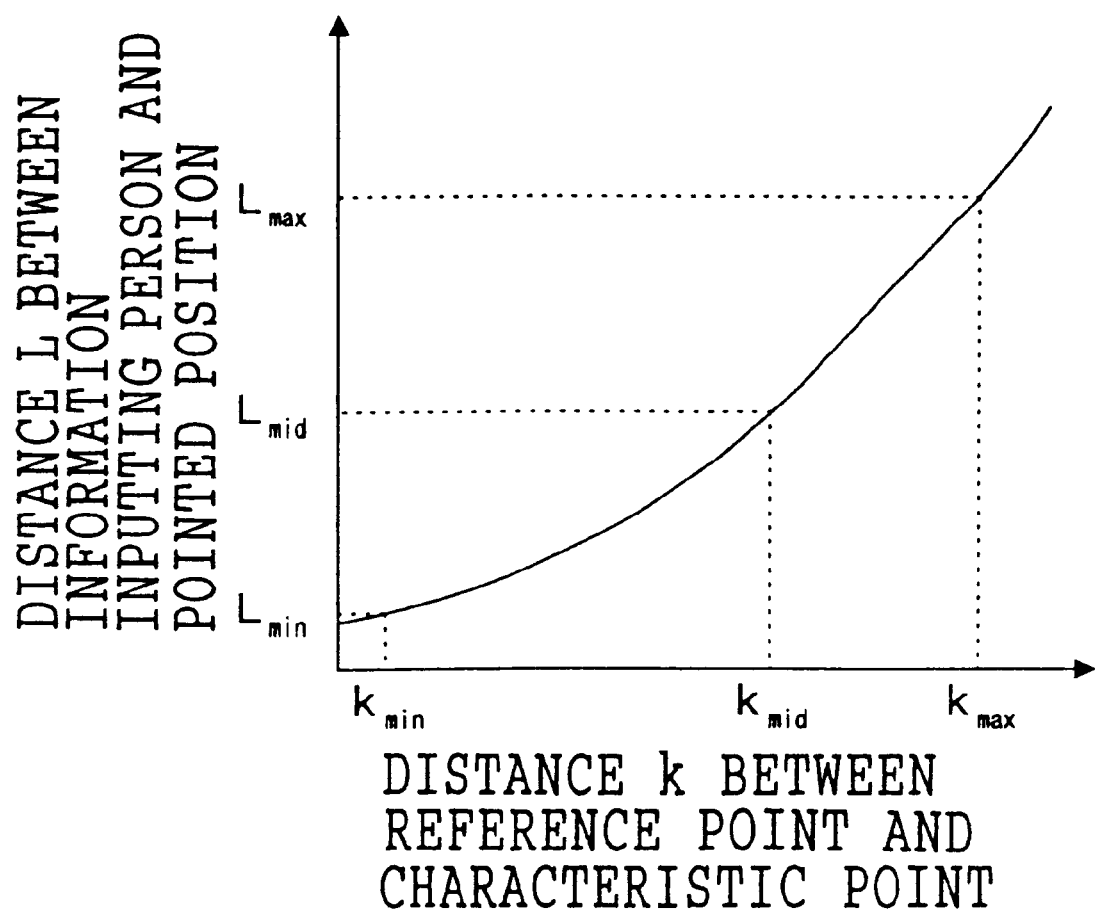
FIG. 15 is a diagram which illustrates an example of the distance conversion conditions for converting a distance k between the reference point and the characteristic point of the information inputting person into a distance L (a virtual distance) between the information inputting person and the position pointed to by the information inputting person.

After both the maximum value $k_{max}$ and the minimum value $k_{min}$ are obtained in Step 270, the routine proceeds to Step 272, where the distance conversion conditions are set for converting the distance k between the reference point $P_0$ and the characteristic point $P_X$ of the information inputting person 10 into the distance L (virtual distance) between the information inputting person 10 and the position which is pointed to by the information inputting person 10. These distance conversion conditions can be determined by using the least square method such that, as shown in FIG. 15, for example, the distance $k_{min}$ is converted into the distance $L_{min}$, the distance $k_{mid}$ is converted into the distance $L_{mid}$, and the distance $k_{max}$ is converted into the distance $L_{max}$ wherein the distance (virtual distance) between the front most position as seen from the information inputting person 10 and the information inputting person 10 is $L_{min}$, the distance between the deepest position as seen from the information inputting person 10 and the information inputting person 10 is $L_{max}$, and the distance between the neutral point and the information inputting person 10 is $L_{mid}$.

The length or the like of the arm may be different depending on the individual information inputting person 10, and accordingly, the width of the change ($k_{max}-k_{min}$) in the distance k when the information inputting person 10's arm is stretched/bent may also differ depending on the individual. However, the above-described distance conversion conditions setting process is carried out each time an information inputting person 10 comes into the information inputting space. The process determines the maximum value and the minimum value of the distance k between the reference point $P_0$ and the characteristic point $P_X$, and sets the distance conversion conditions so that the width of the change ($k_{max}-k_{min}$) in the distance k corresponds to the width of the change ($L_{max}-L_{min}$) in the distance L between each position within the virtual 3-D space and the information inputting person 10. As a result, when another information inputting person 10 comes into the information inputting space, the appropriate conversion conditions can be provided as distance conversion conditions in accordance with the length or the like of the arm of the newly-arrived information inputting person 10.

Further, in the above-described distance conversion conditions, because the conversion characteristics are fixed in view of the distance k between the reference point $P_0$ and the characteristic point $P_X$ when the information inputting person 10 carries out the action of pointing to a neutral point, the conversion characteristics can be corresponded to the senses of the information inputting person 10 so that the distance L between the position which is pointed to by the information inputting person 10 and the information inputting person 10 can be determined accurately.

The distance conversion conditions setting process is carried out as described above, and thereafter, in Step 156 (see FIG. 6), a click action speed setting process is executed. A description of the click action speed setting process will be given with respect to the flowchart in FIG. 9. Further, the click action speed setting process corresponds to the threshold value setting means according to the seventh aspect of the present invention.

In Step 290, the click action speed setting process instructs the information processing apparatus 14 to display on the display 12, a message which requests the information inputting person 10 to carry out a click action. The information processing apparatus 14 causes the display 12 to display the message. The present embodiment fixes the click action as a motion in which the information inputting person 10 moves his hand forward quickly (see FIG. 16A, which is referred to as a forward click) and a motion in which the information inputting person 10 moves his hand backward quickly (see FIG. 16B, which is referred to as a backward click). When the aforementioned message is displayed on the display 12, the information inputting person 10 bends or stretches out an arm, and repeats the forward click action and the backward click action.

In Step 292, the process results from the reference point/characteristic point coordinate computation process (the 3-D coordinates of the reference point $P_0$ and the characteristic point $P_X$) are captured. In Step 294, it is determined whether the information inputting person 10 is carrying out the action of pointing to the display 12. When the determination is negative in Step 294, the routine returns to Step 292, and Step 292 and Step 294 are repeated until the information inputting person 10 carries out the pointing action. When the determination in Step 294 is affirmative, the routine proceeds to Step 296.

In Step 296, the distance k between the reference point $P_0$ and the characteristic point $P_X$ is computed from the 3-D coordinates of the reference point $P_0$ and the characteristic point $P_X$, which are captured in Step 292. Further, Step 296 is carried out repeatedly. However, when Step 296 is carried out for the second time and thereafter, the speed V of the change in the distance k (the speed at which the position of the characteristic point $P_X$ moves to the position of the reference point $P_0$) is computed on the basis of the difference of the value of the distance k which has been computed this time and the value of the distance k which was computed for the previous time, and the computing results are stored.

In Step 298, the message requesting "carry out click action" is displayed on the display 12 and thereafter, it is determined whether a predetermined time has been passed. When the determination is negative, the routine returns to Step 292, and Steps 292 to 298 are repeated. Accordingly, from the time when the message requesting "carry out click action" until the time when a predetermined time has passed, the speed V of the change in the distance k between the characteristic point $P_X$ and the reference point $P_0$) is computed and stored repeatedly.

When the determination is affirmative in Step 298, the routine proceeds to Step 300. In Step 300, the previously computed and recorded speed of the change V is captured and the speed of the click action $V_0$ (which corresponds to a threshold value according to the fifth to seventh aspects of the present invention) is set and stored based on the progress of the speed of the change V while the information inputting person 10 is performing the click action once. The click action speed $V_0$ is used as a threshold value for determining whether the information inputting person 10 has carried out the click action in a process which will be described later. For this reason, in order to reliably determine whether the information inputting person 10 carried out the click action, for example, a value which is slightly less than the mean value of the speed of the change V in a single click action by the information inputting person 10 can be set for the click action speed $V_0$. In addition, the minimum value of the speed of the change in a single click action by the information inputting person 10 can be set for the click action speed $V_0$.

The transition speed (speed of the change V) of the characteristic point $P_X$ when the information inputting person 10 carries out the click action by bending or stretching an arm may vary depending on the individual information inputting person 10. However, since the above-described click action speed setting process is carried out each time an information inputting person 10 comes into the information inputting space, when a new information inputting person 10 comes into the information inputting space, an appropriate value in accordance with the physique or the muscular strength of the new information inputting person 10 who comes into the information inputting space is newly set as the click action speed $V_0$.

After the above-described click action speed setting process has been completed, the routine proceeds to Step 158 in the pointing determination process (see FIGS. 6A through 6D). In and after Step 158, the determination process for determining whether the information inputting person 10 carries out the pointing action is executed. Namely, in Step 158, the process results by the reference point/characteristic point coordinate computation process (the 3-D coordinates of the reference point $P_0$ and the characteristic point $P_X$) are captured. In Step 160, it is determined whether the information inputting person 10 carries out a pointing action.

When the determination is negative in Step 160, the routine proceeds to Step 194, wherein it is determined whether the information inputting person 10 has left the information inputting space. In the same manner as Step 150, an extremely simple determination is made in which it is determined whether the image portion whose intensity is high and which has an area which is greater than or equal to a predetermined value is lost from the image A and the image B. When this determination is negative, the routine returns to Step 158, and Steps 158, 160, and 194 are repeated.

Further, when the determination is affirmative in Step 160, the routine proceeds to Step 162, where, on the basis of the 3-D coordinates of the reference point $P_0$ and the characteristic point $P_X$ which are captured in the previous Step 158, the coordinates (plane coordinates) of an intersection point (see the point S in FIGS. 17A and 17B) of a virtual line connecting the above-described reference point and the characteristic point (see virtual line 54 in FIGS. 17A and 17B), and a plane including the display screen of the display 12 are computed. In Step 164, on the basis of the coordinates of the intersection point S which is obtained in Step 162, it is determined whether the information inputting person 10 is pointing at the display screen of the display 12. When this determination is negative, the routine proceeds to Step 194, and Steps 158 to 164, and Step 194 are repeated.

Meanwhile, when the determination is affirmative in Step 164, it can be determined that the information inputting person 10 is pointing at the specific position within the virtual 3-D space represented by a three-dimensional image displayed on the display 12. For this reason, the routine proceeds to Step 166, where, on the basis of the 3-D coordinates of the reference point $P_0$ and the characteristic point $P_X$ which are captured in advance, as the direction in which the position pointed to by the information inputting person 10 exists, the direction in which the virtual line connecting the reference point $P_0$ and the characteristic point $P_X$ extends (i.e., the direction from the reference point $P_0$ to the characteristic point $P_X$) is computed.

In Step 168, on the basis of the 3-D coordinates of the reference point $P_0$ and the characteristic point $P_X$ which are captured previously, the distance k between the reference point $P_0$ and the characteristic point $P_X$ is computed. Then, in accordance with the distance conversion conditions (see FIG. 15) which are set in the above-described distance conversion conditions setting process (see FIGS. 8A through 8C), as shown in FIG. 18, the distance k between the reference point $P_0$ and the characteristic point $P_X$ is converted into the distance L (virtual distance) between the information inputting person 10 and the position pointed to by the information inputting person 10. In Step 170, the position pointed to by the information inputting person 10 is determined to be the position which is spaced apart from the reference point $P_0$ by the distance L which has been obtained in Step 168 and which is in the direction computed in Step 166 so that the 3-D coordinates of the position in the virtual 3-D space, pointed to by the information inputting person 10 are computed.

Accordingly, even when the information inputting person 10 points to an arbitrary position within the virtual 3-D space represented by a three dimensional image displayed on the display 12, it is possible to determine the 3-D coordinates of the position which is pointed to by the information inputting person 10. Further, the above-described Steps 166 to 170 correspond to the determining means of the present invention.

In Step 172, the 3-D coordinates of the position pointed to by the information inputting person 10 which has been computed in Step 170 are converted into the position (2-D coordinates) which is pointed to on the display screen of the display 12 (the 2-D coordinates can be obtained through computation using a functional equation) in accordance with the coordinate data which is stored in the storage device 24, and this process instructs the information processing apparatus 14 to display the cursor 52 at the aforementioned position (see FIG. 18). The size of the cursor 52 displayed on the display 12 can be decreased as the length L which has been determined in Step 168 increases.

In the present embodiment, the information inputting person 10 can instruct that the magnitude (zoom-in or zoom-out) of a three dimensional image which is displayed on the display 12 be changed. Namely, in order to distinguish the motion in which the information inputting person 10 is pointing to a specific position within the virtual 3-D space from the motion in which the information inputting person 10 instructs that the display magnification of a three dimensional image which is displayed on the display 12 be changed, for example, when the information inputting person 10 carries out a pointing action, it is previously determined that the information inputting person 10's hand is formed in a shape in which the thumb and all the fingers except for the forefinger are bent (see FIG. 19A), and when the information inputting person 10 instructs the display magnification to be changed, the information inputting person 10's hand is in a specific shape in which all the fingers except for the thumb are stretched out (see FIG. 19B).

In Step 174, it is determined whether the information inputting person 10's hand is in a specific shape (the shape in which all the fingers except for the thumb are stretched out). Namely, it is determined whether the information inputting person 10 instructs that the display magnification of a three dimensional image be changed. Further, this Step 174 corresponds to the determining means according to the fourth aspect of the present invention.

When the determination is negative in Step 174, it is determined that the information inputting person 10 is not carrying out the motion to instruct the display magnification of a three dimensional image to be changed, and the routine proceeds to Step 176, wherein it is determined whether the distance k which has been computed previously in Step 168 is changed. Step 168 is carried out repeatedly while the information inputting person 10 is performing the pointing action of pointing to the display screen of the display 12 (while the determination is affirmative in Step 164). However, when the distance k is computed for the first time in Step 168, because it cannot be determined whether the distance k has changed, the determination is unconditionally negative in Step 176.

When the determination is affirmative in Step 176, the routine proceeds to Step 178, wherein the speed of the change V in the distance k is computed, and it is thereby determined whether the computed speed of the change V is greater than or equal to a threshold value (i.e., the click action speed $V_0$ which is set by the click action speed setting process). Moreover, also in Step 178, when the distance k is computed for the first time in Step 168, because the speed of the change V in the distance k cannot be computed, the determination is unconditionally negative. When the determination is negative in Step 176 or in Step 178, it is thereby determined that the information inputting person 10 is not carrying out the click action, and the routine proceeds to Step 194.

Moreover, when the determination is affirmative, respectively in Step 176 and Step 178, it is thereby determined that the information inputting person 10 has carried out the click action, and in Step 180, the direction of the change in the distance k is determined, and the routine is branched in accordance with the results of the determination. When the distance k changes in the direction of increase, it can be determined that the information inputting person 10 has carried out a forward click action in which the information inputting person 10 moves his or her hand forward quickly. The routine proceeds to Step 182, wherein information indicating that the forward click action has been carried out is outputted to the information processing apparatus 14, and the routine proceeds to Step 194. Further, when the distance k changes in the direction of decrease, it can be determined that the information inputting person 10 has carried out a backward click action in which the information inputting person 10 bends his or her hand backward quickly. Therefore, the routine proceeds to Step 184, wherein information indicating that the backward click action has been carried out is outputted to the information processing apparatus 14, and the routine proceeds to Step 194.

When information indicating that "forward click action" or "backward click action" has been carried out is outputted to the information processing apparatus 14, it is determined that the current position pointed to by the information inputting person 10 is clicked by the information inputting person 10. When the "forward click action" is carried out, the first process corresponding to the current position pointed to by the information inputting person 10 is executed. When the "backward click action" is carried out, the second process corresponding to the current position pointed to by the information inputting person 10 (this process is different from the first process) is executed. Further, the first and second processes correspond to the predetermined process according to the fifth aspect of the present invention (in more detail, the first predetermined process and the second predetermined process according to the sixth aspect of the present invention), and, for example, a process relating to a position pointed to by the information inputting person 10 within a virtual 3-D space (a process relating to an object which is located at the position pointed to by the information inputting person 10) (a description of an example thereof will be described later).

In this way, Steps 178 to 184 correspond to the information processing apparatus 14 which actually executes the first process and the second process, and the processing means according to the fifth aspect of the present invention (in more detail, the sixth aspect of the present invention).

When the determination is affirmative in Step 174, the routine proceeds to Step 186, where it is determined whether the distance k which is computed in the previous Step 168 has changed. Further, also in Step 186, when the distance k is computed in Step 168 for the first time, because it cannot be determined whether the distance k has changed, the determination is unconditionally negative. When the determination is negative in Step 186, although the information inputting person 10's hand is shaped so as to instruct that the display magnification of a three dimensional image be changed in view of the fact that it is not instructed as to what degree the display magnification needs to be changed, the routine proceeds to Step 194.

When the determination is affirmative in Step 186, the routine proceeds to Step 188, where the amount of the change in the distance k is computed, the amount of the change in the distance k is converted into the amount of the change of the display magnification of a three dimensional image. In Step 190, the display magnification of a three dimensional image to be displayed on the display 12 is changed in accordance with the amount of the change of the display magnification which is computed in Step 188. And the information processing apparatus 14 is instructed to again display a three dimensional image on the display 12 so that the current position pointed to by the information inputting person 10 (i.e., the position which corresponds to the 3-D coordinates computed in Step 170) is located substantially at the center of the display screen of the display 12.

Figure 20A:
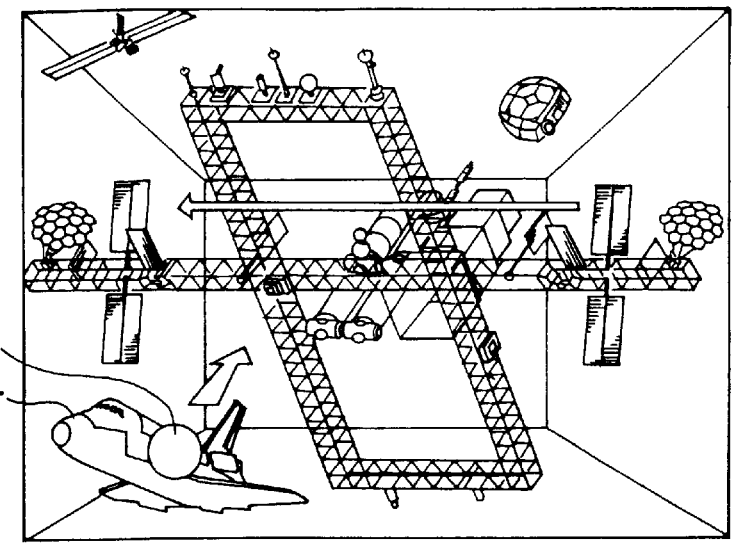
FIG. 20A is an image view which illustrates an example of a three-dimensional image before the display magnification is changed.
Figure 20B:
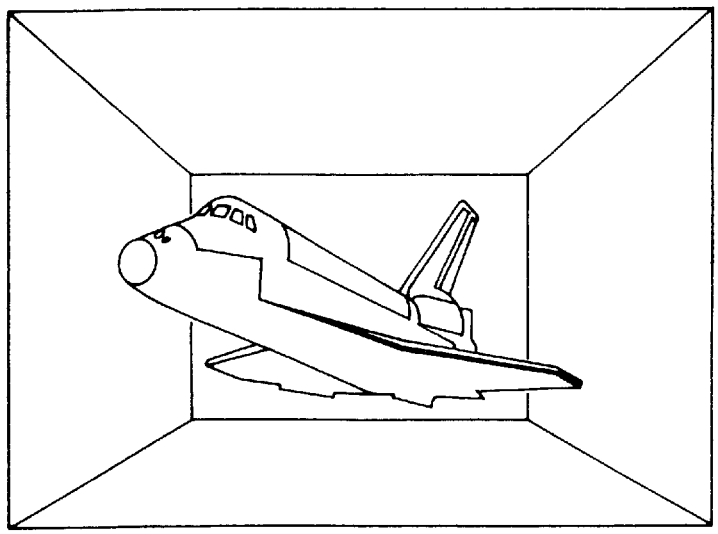
FIG. 20B is an image view which illustrates an example of a three-dimensional image which is enlarged and displayed in response to the action of the information inputting person.

Accordingly, for example, as shown in FIG. 20A, in a state in which a three dimensional image representing a part of the universe displayed on the display 12, and the information inputting person 10 is pointing at a space shuttle 54 in the three dimensional image, when an enlarged display (zoom-in) of a three dimensional image is instructed by the information inputting person 10, as shown in FIG. 20B, the space shuttle 54 is located at the center of the display screen of the display 12, and a three dimensional image is displayed again in such a way that an enlarged three dimensional image is displayed in accordance with the amount of the change of the display magnification.

Figure 20C:
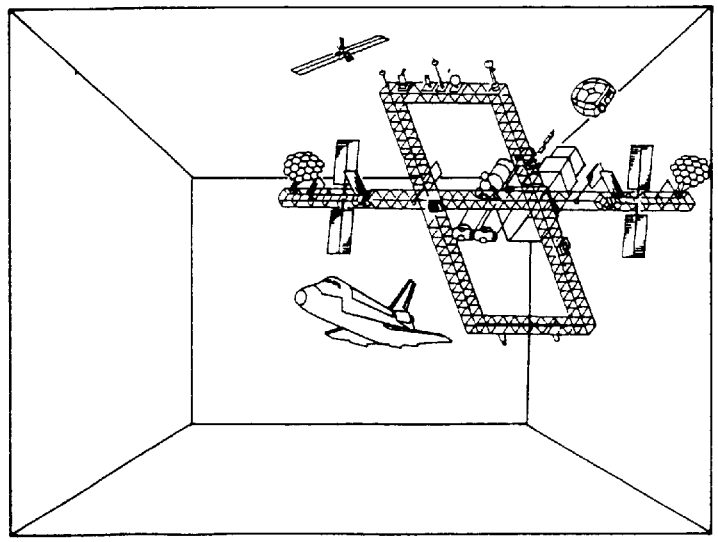
FIG. 20C is an image view which illustrates an example of the three-dimensional image which is reduced and displayed in response to the action of the information inputting person.

Further, when a display of a three dimensional image is instructed to be reduced (zoom-out) by the information inputting person 10 in the same state as described above, as shown in FIG. 20C, the space shuttle 54 is located at the center of the display screen of the display 12, and a three dimensional image is displayed again in such a way that a reduced three dimensional image is displayed in accordance with the amount of the change of the display magnification.

In this way, Steps 186 to 190 correspond to the information processing apparatus 14 which actually controls the display of the 3-D image, and the display control means according to the fourth aspect of the present invention. Because the virtual distance between each of the positions pointed to by the information inputting person 10 within a virtual 3-D space and the information inputting person 10 changes in response to the change in the aforementioned display magnification, in the aforementioned Step 190, the distance conversion conditions are corrected in accordance with the change in the virtual distance. Next, in Step 192, the cursor 152 is displayed again in accordance with the three dimensional image which is displayed again, and the routine proceeds to Step 194.

When the information inputting person 10 who comes into the information inputting space carries out a pointing action at an arbitrary portion within a virtual 3-D space, which is represented by a three dimensional image displayed on the display 12, the cursor 52 is displayed at a position which corresponds to the position pointed to by the information inputting person 10 on the screen of the display 12. When the information inputting person 10 carries out a "forward click action" or "backward click action", a desired process (e.g., a process related to the position pointed to by the information inputting person 10) can be executed.

When the information inputting person 10's hand is in a shape in which all the fingers except for the thumb are stretched out, the arm of the information inputting person 10 is bent or stretched out so that the display magnification of the three dimensional image which is displayed on the display 12 has a desired magnification, the three dimensional image can obtain the desired magnification and can be displayed again around the position which is pointed to by the information inputting person 10. If, however, the extent of the display magnification of the three dimensional image is insufficient even when the arm of the information inputting person 10 has been bent or stretched out to its fullest extent, then if the shape of the hand is changed so that the thumb and all the fingers except for the forefinger are closed into a fist and the arm is returned to its original bent or stretched out position, by then repeating the magnification instruction action, the magnification of the display may be increased or reduced even further.

When the information inputting person 10 leaves the information inputting space, the determination is affirmative in Step 194, the execution of the reference point/characteristic point coordinate computation process (FIGS. 7A through 7C) is terminated in Step 196, and thereafter, the routine returns to Step 150, and waits until the information inputting person 10 comes again into the information inputting space. When the information inputting person 10 comes again into the information inputting space, the processes in and after Step 152 are repeated.

In the controller 22 of the hand pointing input apparatus 20, the position on the display screen of the display 12 pointed to by the information inputting person 10 and the execution of the click action can be determined in real time by effecting the above-described pointing determination process, therefore, in combination with the process which is carried out in the information processing apparatus 14, the pointing determination process can be used in various forms of applications.

For example, a three dimensional image picked up from altitude showing a number of ships lined up is displayed on the display 12. In a state in which a user (the information inputting person 10) is pointing to a particular ship within a virtual 3-D space represented by the three dimensional image, when a specific pointing action (e.g., a forward click action) is carried out, data for the ship pointed to is displayed, and when another specific pointing action (e.g., a backward click action) is executed, the aforementioned ship and any other ships relevant to the selected ship are distinguished from the other ships and thereby displayed. When the display is enlarged on the user's instruction (pointing action), the aforementioned ship is enlarged and displayed so as to be at the center of the display. Accordingly, it can be used as an interface for retrieving information from a ship database. Instead of ships, it should be appreciated that the present invention can be applied to automobiles, aircraft, bicycles, electrical equipment, machine components or the like.

Further, on the basis of CAD data created in the process of designing a building, 3-D image data which corresponds to an image of the inside of the building while the building is still at the steel frame stage may be created and displayed on the display 12. The display of the 3-D image may then be changed so that it appears to the user as if they are actually moving inside the building in response to their instruction. Then, if the designer (information inputting person) performs a specific instruction (for example, a forward click) while pointing to a specific point on the 3-D image displayed on the virtual 3-D space, the position pointed to may be stored as, for example, the starting point or terminal point of the plumbing layout. If another specific instruction is made (for example, a backward click), then various types of plumbing layouts may be displayed together and the type of plumbing desired selected from these. The selected plumbing may then be displayed laid out between the starting point and terminal point of the plumbing layout overlapping the 3-D image. This would allow the layout of the of the plumbing to be verified cubically. The present invention would thus assist in the designing of the plumbing systems and the like of the plumbing systems and the like of the interior of a building or other construction by acting as a design support system.

As another example, the display 12 may be installed in the remote control room of a crane. A three dimensional image which is obtained from images picked up of the working site by a plurality of video cameras which are mounted to the crane is displayed on the display 12. When an operator (an information inputting person) points to a specific position within a virtual 3-D space represented by a three dimensional image and provides a specific instruction (for example, a forward click), then, for example, the crane's arm may be rotated and moved toward the specific position. When another specific instruction (for example, a backward click) is provided, for example, the crane's arm may be moved vertically toward the specific position. Accordingly, the present invention may be used for a three-dimensional operation system which enables an operator to operate a crane without having to climb to a great height. As another example, the three dimensional image representing a motor vehicle may be displayed on the display 12. If a user (the information inputting person) makes a specific instruction (for example, a forward click) while pointing to the bonnet, for example, then the 3-D image may be changed to show the vehicle bonnet open. Then, if the user makes a further specific instruction (for example, a forward click) while pointing to the vehicle's engine, then the engine's performance and the like may be displayed overlapping the 3-D image. If another specific instruction is made (for example, a backward click), then that might be regarded as an instruction to cancel the previous instruction and the engine's performance a n d the like would be deleted. Thus the present invention might also be used for a virtual auto show room. When a specific instruction (for example, a forward click) is provided in a state in which a user (a information inputting person) is pointing at an engine of the vehicle, the engine performance or the like is displayed so as to overlap the three dimensional image. When another specific instruction (for example, a backward click) is provided, the instruction is determined to be canceled, and the display of the engine performance or the like is canceled and can be used as a virtual showroom of the vehicle. In this case, for example, the action to change the display magnification which has been described above might be used as an action to change the orientation of the vehicle. For example, if the user made a zoom-in or zoom-out action while pointing to the front of the vehicle, then the entire vehicle might be shown as moving in either a clockwise or anti-clockwise direction.

The display 12, the hand pointing input apparatus 20, and the information processing apparatus 14 might also, for example, be operated as a game machine which performs 3-D simulation games at amusement centers.

In the above descriptions, an example in which two video cameras 36A and 36B are provided has been explained. However, the present invention is not limited to this, and more video cameras may be used to pick up images from each information inputting space, and to determine the instructions from the information inputting person 10.

In the above description, the distance conversion conditions are set by considering a distance k between the reference point $P_0$ and the characteristic point $P_X$ at the time when the information inputting person 10 points to a neutral point. However, the present invention is not limited to this. The distance conversion conditions can be set merely based on a maximum value $k_{max}$ and a minimum value $k_{min}$ of the distance k. In this case, the conversion characteristics of the distance conversion conditions can be made linear (for example, conversion characteristics in which the distance L may vary in proportion to the distance k). However, especially when a virtual 3-D space which is represented by a three dimensional image is a space whose depth is very long (for example, if a three dimensional image which represents a part of the universe is displayed on the display means or the like), preferably, the conversion characteristics are made non-linear (for example, the conversion characteristics which may vary the distance between the person to be recognized and the specific position in proportion to the number raised to the nth ($n \geq 2$) power of the change in the distance between the reference point and the characteristic point).

In the above description, an example of an aspect in which an arbitrary position within a virtual 3-D space which is represented by a three dimensional image which is displayed on the display 12 has been explained. However, the object to which the information inputting person points is not limited to a virtual 3-D space. The present invention can be applied to cases in which the information inputting person points at an arbitrary position within an actual 3-D space. The structure in which the information inputting person points at an arbitrary position within an actual 3-D space may be used in cases in which, for example, at a theater or the like, the illuminating direction of a spot light, the direction of an acoustic beam which is formed by a large number of speakers which are lined up in an array is oriented in the direction in which an operator (information inputting person) is pointing.

As described above, in accordance with the first aspect of the present invention, a hand pointing apparatus extracts an image portion which corresponds to the person to be recognized from a plurality of images which are obtained by picking up images of the state in which the person to be recognized is pointing at a specific position within a 3-D space from a plurality of directions, determines the 3-D coordinates of a characteristic point whose position may be changed by the person to be recognized bending or stretching an arm, and a reference point whose position does not change even when the person to be recognized bends or stretches an arm, and thereby determines the direction in which the specific position exists within the 3-D space on the basis of the direction from the reference point to the characteristic point and determines the position of the specific position within the 3-D space along the depth direction thereof on the basis of the distance between the reference point and the characteristic point so that the 3-D coordinates of the specific position within the 3-D space can be determined. As a result, an excellent effect can be provided in which even when the information inputting person points at an arbitrary position within a 3-D space, the 3-D coordinates of the portion pointed to by the information inputting person can be determined.

In accordance with the third aspect of the present invention, there is provided a hand pointing apparatus according to the second aspect of the present invention, wherein because the conversion characteristics of the conversion conditions which convert the distance between the reference point and the characteristic point into the distance between the person to be recognized and the specific position can be set on the basis of the width of the change in the distance between the reference point and the characteristic point when the person to be recognized carries out the arm bending or stretching action, the conversion characteristics can be obtained in accordance with the individual physique of the person to be recognized in spite of the variation of the individual physique of the person to be recognized. As a result, an excellent effect can be obtained in which the location of the specific position in the depth direction of the specific position to which the person to be recognized points can be determined accurately.

In accordance with the fourth aspect of the present invention, there is provided a hand pointing apparatus according to the first aspect of the present invention, wherein, in a state in which the hand of the person to be recognized is in a specific shape, and when the distance between the reference point and the characteristic point is changed, it is possible to control the three dimensional image displayed on the display means so as to be displayed in an enlarged/reduced state. In addition to the aforementioned effects, an excellent effect can be obtained in which the display magnification of the three dimensional image which is displayed on the display means can be changed reliably when the display magnification of a three dimensional image is changed by the instruction from the person to be recognized.

In accordance with the fifth aspect of the present invention, there is provided a hand pointing apparatus according to the first aspect of the present invention, because a predetermined process is executed when the detected speed of the change in the distance between the reference point and the characteristic point is greater than or equal to a threshold value. In addition to the aforementioned effects, an excellent effect can be obtained in which the action in which the person to be recognized instructs a predetermined action can be detected reliably.

In accordance with the sixth aspect of the present invention, when the distance between the reference point and the characteristic point increases at a speed which is greater than or equal to the threshold value, the first predetermined process can be executed, and when the distance between the reference point and the characteristic point decreases at a speed which is greater than or equal to the threshold value, the second predetermined process which is different from the first predetermined process can be executed. As a result, in addition to the aforementioned effects an excellent effect can be obtained in which the person to be recognized can select one of the first predetermined process and the second predetermined process and the process which is selected by the person to be recognized from the first predetermined process and the second predetermined process can reliably be executed.

In accordance with the seventh aspect of the present invention, there is provided a hand pointing apparatus according to the fifth aspect of the present invention, wherein a threshold value is set on the basis of the speed at which the distance between the reference point and the characteristic point changes when the person to be recognized carries out the arm bending or stretching action of the person to be recognized. In addition to the aforementioned effects, an excellent effect can be obtained in that a threshold value can be determined in response to the physique, the muscular strength or the like of the individual person to be recognized, the action in which the person to be recognized instructs that a predetermined process be executed can be detected reliably so that a predetermined process can be executed in spite of the variation in the physique, the muscular strength or the like of each of the persons to be recognized.

What is claimed is:

1. A hand pointing apparatus, comprising:

a plurality of image pickup devices for picking up, from a plurality of different directions, a plurality of images including a person to be recognized;

a computing section which (1) extracts a plurality of image portions which correspond to the person to be recognized on the basis of the plurality of images obtained by said plurality of image pickup devices respectively, the plurality of images including the person to be recognized pointing to a specific point which is within one of a 3-D space to be pointed by the person to be recognized or a dummy 3-D space to be pointed by the person to be recognized, and (2) determines a coordinate of a position of a characteristic point related to the person to be recognized, the position of the characteristic point changing by the person to be recognized bending or stretching his or her arm, and determines a coordinate of a position of a reference point, the position of the reference point not changing even when the person to be recognized bends or stretches the arm, on the basis of the extracted image portions;

a determining section for (1) determining a specific point direction in which direction the specific point exists, on the basis of a direction from the reference point to the characteristic point, and (2) determining a position of the specific point along the specific point direction, on the basis of a distance between the reference point and the characteristic point, and thereby the determining section determining a 3-D coordinate of the specific point within one of the 3-D space or the dummy 3-D space; and a processing section which detects a speed at which the distance between the reference point and the characteristic point changes, and executes a predetermined process when the detected speed at which the distance between the reference point and the characteristic point changes is greater than or equal to a threshold value.

2. A hand pointing apparatus according to claim 1, wherein said determining means determines the location of said specific position within said 3-D space in the depth direction thereof by converting the distance between said reference point and said characteristic point into the distance between said person to be recognized and said specific position in accordance with predetermined conversion conditions.

3. A hand pointing apparatus according to claim 2, further comprising: conversion conditions setting means which requests said person to be recognized to carry out said arm bending or stretching action, and sets in advance said conversion conditions which convert the distance between said reference point and said characteristic point into the distance between the person to be recognized and said specific position on the basis of the extent of the change in the distance between said reference point and said characteristic point when said person to be recognized carries out said arm bending or stretching action.

4. A hand pointing apparatus according to claim 1, further comprising:

display means which displays a three dimensional image;

display control means which displays said three dimensional image on said display means; and marker display means which displays a marker having an arbitrary shape which can be easily recognized by said person to be recognized, wherein said three dimensional image is an image which represents a virtual 3-D space, and includes an image which is formed conforming to a one-point perspective method or two-point perspective method, and image which uses a liquid crystal shutter or a lenticular lens, and a stereographic image which is displayed by applying holographic technology, and said conversion conditions setting means causes the person to be recognized to point to a single position which is marked by said marker which is positioned at the intermediate portion of said 3-D space along the depth direction thereof, and sets said conversion conditions on the basis of the distance between said reference point and said characteristic point when the person to be recognized points to the single position which is marked by the marker which is positioned at the intermediate portion of the 3-D space along the depth direction thereof.

5. A hand pointing apparatus according to claim 3, further comprising:

display means which displays a three dimensional image;

display control means which displays said three dimensional image on said display means; and marker display means which displays a marker having an arbitrary shape which can be easily recognized by said person to be recognized, wherein said three dimensional image is an image which represents a virtual 3-D space, and includes an image which is formed conforming to a one-point perspective method or two-point perspective method, an image which uses a liquid crystal shutter or a lenticular lens, and a stereographic image which is displayed by applying holographic technology, and said conversion conditions setting means causes said person to be recognized to point to a plurality of different positions which are marked by said marker along the depth direction of said 3-D space, and sets said conversion conditions on the basis of the distance between said reference point and said characteristic point.

6. A hand pointing apparatus according to claim 3, wherein said conversion conditions are conversion characteristics in which the distance between said person to be recognized and the specific position within said 3-D space which is pointed to by said person to be recognized changes linearly in response to the change in the distance between said reference point and said characteristic point.

7. A hand pointing apparatus according to claim 3, wherein said conversion conditions are conversion characteristics in which the distance between said person to be recognized and the specific position within said 3-D space which is pointed to by said person to be recognized changes non-linearly in response to the change in the distance between said reference point and said characteristic point.

8. A hand pointing apparatus according to claim 3, comprising:

display means for displaying a three dimensional image; and display control means which displays said three dimensional image on said display means, wherein said three dimensional image is an image which represents a virtual 3-D space, and includes an image which is formed conforming to a one-point perspective method or two-point perspective method, an image which uses a liquid crystal shutter or a lenticular lens, and a stereographic image which is displayed by applying holographic technology, and said conversion conditions setting means corrects said conversion conditions in accordance with the variation of the display magnification of said three dimensional image which is displayed on said display means in an enlarged or reduced state.

9. A hand pointing apparatus according to claim 3, comprising:

display means for displaying a three dimensional image; and display control means which displays said three dimensional image on said display means, wherein said three dimensional image is an image which represents a virtual 3-D space, and includes an image which is formed conforming to a one-point perspective method or two-point perspective method, an image which uses a liquid crystal shutter or a lenticular lens, and a stereographic image which is displayed by applying holographic technology, and the display magnification of said three dimensional image which is displayed on said display means may vary linearly in response to the change in the distance between said reference point and said characteristic point.

10. A hand pointing apparatus according to claim 3, comprising:

display means for displaying a three dimensional image; and display control means which displays said three dimensional image on said display means, wherein said three dimensional image is an image which represents a virtual 3-D space, and includes an image which is formed conforming to a one-point perspective method or two-point perspective method, an image which uses a liquid crystal shutter or a lenticular lens, and a stereographic image which is displayed by applying holographic technology, and the display magnification of said three dimensional image which is displayed on said display means may vary non-linearly in response to the change in the distance between said reference point and said characteristic point.

11. A hand pointing apparatus according to claim 1, further comprising:

display means which displays a three dimensional image;

display control means which displays said three dimensional image on said display means; and determining means which determines whether the hand of said person to be recognized is in a specific shape, wherein said three dimensional image is an image which represents a virtual 3-D space, and includes an image which is formed confirming to a one-point perspective method or two-point perspective method, an image which uses a liquid crystal shutter or a lenticular lens, and a stereographic image which is displayed by applying holographic technology, and said person to be recognized points to a specific position within said virtual 3-D space which is represented by said three dimensional image which is displayed on said display means, and in a state in which the hand of said person to be recognized is determined to be in a specific shape, when the distance between said reference point and said characteristic point changes, said display control means controls said display means such that said three dimensional image displayed on said display means is displayed so as to be enlarged or reduced according to the change in the distance between said reference point and said characteristic point.

12. A hand pointing apparatus according to claim 11, wherein said display control means displays said three dimensional image on said display means so as to be enlarged or reduced by changing the display magnification of said three dimensional image which is displayed on said display means in response to the change in the distance between said reference point and said characteristic point.

13. A hand point apparatus according to claim 1, wherein said processing means executes a fist predetermined process when the distance between said reference point and said characteristic point increases at a speed which is greater than or equal to said threshold value, and executes a second predetermined process which is different from the first predetermined process when the distance between said reference point and said characteristic point decreases at a speed which is greater than or equal to said threshold value.

14. A hand pointing apparatus according to claim 1, further comprising:

threshold value setting means which requests said person to be recognized to carry out the arm bending or stretching action to cause said processing mean to execute said predetermined process, and hereby sets said threshold value in advance on the basis of the speed at which the distance between said reference point and said characteristic point changes when said person to be recognized carries out the arm bending or stretching action.

15. A hand pointing apparatus according to claim 14, wherein said threshold value setting means sets, as said threshold value, a value which is less than the mean value of the speed at which said distance changes when said person to be recognized has carried out the arm bending or stretching action.

16. A hand pointing apparatus according to claim 14, wherein said threshold value setting means sets, as said threshold value, the minimum value of the speed at which said distance changes when said person to be recognized carries out the arm bending or stretching action.

17. A hand pointing apparatus according to claim 14, wherein said threshold value setting means sets said threshold value anew each time a person to be recognized is replaced by another person to be recognized.

18. A hand pointing apparatus, comprising:

an image pickup device for picking up a plurality of images including a person to be recognized;

a computing section which (1) extracts a plurality of image portions which correspond to the person to be recognized on the basis of the plurality of images obtained by said image pickup device the plurality of images including the person to be recognized pointing to a specific point which is within one of a 3-D space to be pointed by the person to be recognized or a dummy 3-D space to be pointed by the person to be recognized, and (2) determines a coordinate of a position of a characteristic point related to the person to be recognized, the position of the characteristic point changing by the person to be recognized bending or stretching his or her arm, and determines a coordinate of a position of a reference point, the position of the reference point not changing even when the person to be recognized bends or stretches the arm, on the basis of the extracted image portions;

a determining section for (1) determining a specific point direction in which direction the specific point exists, on the basis of a direction from the reference point to the characterisitc point, and (2) determining a position of the specific point along the specific point direction, on the basis of a distance between the reference point and the characteristic point, and thereby the determining section determining a 3-D coordinate of the specific point within one of the 3-D space or the dummy 3-D space; and a processing section which detects a speed at which the distance between the reference point and the characteristic point changes, and executes a predetermined process when the detected speed at which the distance between the reference point and the characteristic point changes is greater than or equal to s threshold value.

19. A hand pointing apparatus according to claim 18, further comprising a light reflecting device, wherein one of the plurality of images including the person to be recognized is a reflected image on said light device.

20. A hand pointing apparatus, comprising:

a plurality of image pickup devices for picking up, from a plurality of different directions, a plurality of images including a person to be recognized, the person to be recognized pointing to a specific point which is within one of a 3-D space to be pointed by the person to be recognized or a dummy 3-D space to be pointed by the person to be recognized or a dummy 3-D space to be pointed by the person to be recognized;

a computing section which (1) extracts, from the plurality of images picked up from the plurality of image pickup devices, a plurality of image portions which correspond to the person to be recognized, and (2) determines, on the basis of the extracted image portions, a coordinate of a position of a characteristic point related to the person to be recognized, the position of the characteristic point changing by the person to be recognized moving a portion of a body of the person to be recognized, and determines a coordinate of a position of a reference point, the position of the reference point not changing even when the person to be recognized moves the portion of the body of the person to be recognized;

a determining section for (1) determining a specific point direction in which direction the specific point exists, on the basis of a direction in which direction the specific point exists, on the basis of a direction from the reference point to the characteristic point, and (2) determining a position of the specific point along the specific point direction, on the basis of a distance between the reference point and the characteristic point, thereby the determining section determining a 3-D coordinate of the specific point within one of the 3-D space or the dummy 3-D space; and a processing section which detects a speed at which the distance between the reference point and the characteristic point changes, and executes a predetermined process when the detected speed at which the distance between the reference point and the characteristic point changes is greater than or equal to a threshold value.

21. A hand pointing apparatus, comprising:

a plurality of image pickup devices for picking up, from a plurality of different directions, a plurality of images including a person to be recognized;

a computing section which (1) extracts a plurality of image portions which correspond to the person to be recognized on the basis of the plurality of images obtained by said plurality of image pickup devices restively, the plurality of images including the person to be recognized pointing to a specific point which is with one of a 3-D space to be pointed by the person to be recognized or a dummy 3-D space to be pointed by the person to be recognized (2) determines a coordinate of a position of a characteristic point related to the person to be recognized, the position of the characteristic point changing by the person to be recognized bending or stretching his or her arm, and determines a coordinate of a position of a reference point, the position of the reference point not changing even when the person to be recognized bends or stretches the arm, on the basis of the extracted image portions, and calculating a distance between the characteristic point and the reference point;

a determining section for (1) determining a specific point direction in which direction the specific point exists, on the basis of a direction from the reference pit to the characteristic point, and (2) determining a position of the specific point along the specific point direction, by corresponding the calculated distance between the reference point and the characteristic point to a distance between the person and the specific point, and thereby the determining section determining a 3-D coordinate of the specific point within one of the 3-D space or the dummy 3-D space.

22. A hand pointing apparatus, comprising:

an image pickup device for picking up a plurality of images including a person to be recognized;

a computing section which (1) extracts a plurality of image portions which correspond to the person to be recognized on the basis of the plurality of images obtained by said image pickup device, the plurality of images including the person to be recognized pointing to a specific point which is within one of a 3-D space to be pointed by the person to be recognized or a dummy 3-D space to be pointed by the person to be recognized, (2) determines a coordinate of a position of a characteristic point related to the person to be recognized, the position of the characteristic point changing by the person to be recognized bending or stretching his or her arm, and determines a coordinate of a position of a reference point, the position of the reference point not changing even when the person to be recognized bends or stretches the arm, on the basis of the extracted image portions, and calculating a distance between the characteristic point and the reference point;

a determining section for (1) determining a specific point direction in which direction the specific point exists, on the basis of a direction from the reference point to the characteristic point, and (2) determining a position of the specific point along the specific point direction, by corresponding the calculated distance between the reference point and the characteristic point to a distance between the person and the specific point, and thereby the determining section determining a 3-D coordinate of the specific point within one of the 3-D space or the dummy 3-D space.

* * * * *